US009455599B2

United States Patent
Tanabe

(10) Patent No.: US 9,455,599 B2
(45) Date of Patent: Sep. 27, 2016

(54) ELECTRONIC DEVICE, CONTROL METHOD, AND RECORDING MEDIUM

(75) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 737 days.

(21) Appl. No.: 13/476,909

(22) Filed: May 21, 2012

(65) Prior Publication Data

US 2012/0299391 A1    Nov. 29, 2012

(30) Foreign Application Priority Data

May 25, 2011   (JP) ................. 2011-117135

(51) Int. Cl.
*H02J 1/00* (2006.01)
*H02J 3/00* (2006.01)
*H02J 17/00* (2006.01)

(52) U.S. Cl.
CPC ..................... *H02J 17/00* (2013.01)

(58) Field of Classification Search
CPC .......... H02J 17/00; H02J 5/005; H02J 7/025; H02J 7/00; H02J 7/0004; H02J 7/0044; H02J 3/01; H02J 7/0027; H02J 13/0075; H02J 2007/0096; H02J 4/00; H02J 5/00; H02J 7/0013; H02J 7/0034; H02J 7/0045; H02J 7/0052; H02J 7/04; H02J 3/383; H02J 7/0054; H02J 7/041; H02J 7/045; H02J 7/047
USPC .......................................................... 307/104
See application file for complete search history.

(56) References Cited

U.S. PATENT DOCUMENTS

| | | | | |
|---|---|---|---|---|
| 8,598,747 | B2* | 12/2013 | Bilbrey ............... | G01R 33/3692 307/104 |
| 8,766,592 | B2* | 7/2014 | Fujita .................... | H02J 7/0027 320/107 |
| 2007/0010295 | A1* | 1/2007 | Greene ............... | G06K 19/0707 455/572 |
| 2008/0130538 | A1* | 6/2008 | Raissinia ............... | H04W 28/06 370/310 |
| 2009/0058361 | A1* | 3/2009 | John ..................... | A61N 1/3785 320/128 |
| 2009/0271047 | A1* | 10/2009 | Wakamatsu ............ | H02J 5/005 700/295 |
| 2009/0322280 | A1* | 12/2009 | Kamijo ................... | H02J 9/005 320/108 |
| 2011/0025265 | A1 | 2/2011 | Mochida | |

FOREIGN PATENT DOCUMENTS

| | | |
|---|---|---|
| CN | 101965671 A | 2/2011 |
| JP | 2008-113519 A | 5/2008 |
| JP | 2010-011650 A | 1/2010 |
| JP | 2011-045190 A | 3/2011 |
| JP | 2011-101326 A | 5/2011 |

\* cited by examiner

*Primary Examiner* — Hal Kaplan
*Assistant Examiner* — Esayas Yeshaw
(74) *Attorney, Agent, or Firm* — Canon U.S.A., Inc. IP Division

(57) ABSTRACT

An electronic device includes a power receiving unit that receives power wirelessly from a power supply apparatus, a first unit that transmits, in response to a command received from the power supply apparatus, first information indicating a status of the electronic device, a second unit that transmits second information indicating a status of the electronic device, and a control unit that controls the first unit or the second unit in such a way as to transmit at least one of the first information and the second information to the power supply apparatus.

17 Claims, 9 Drawing Sheets

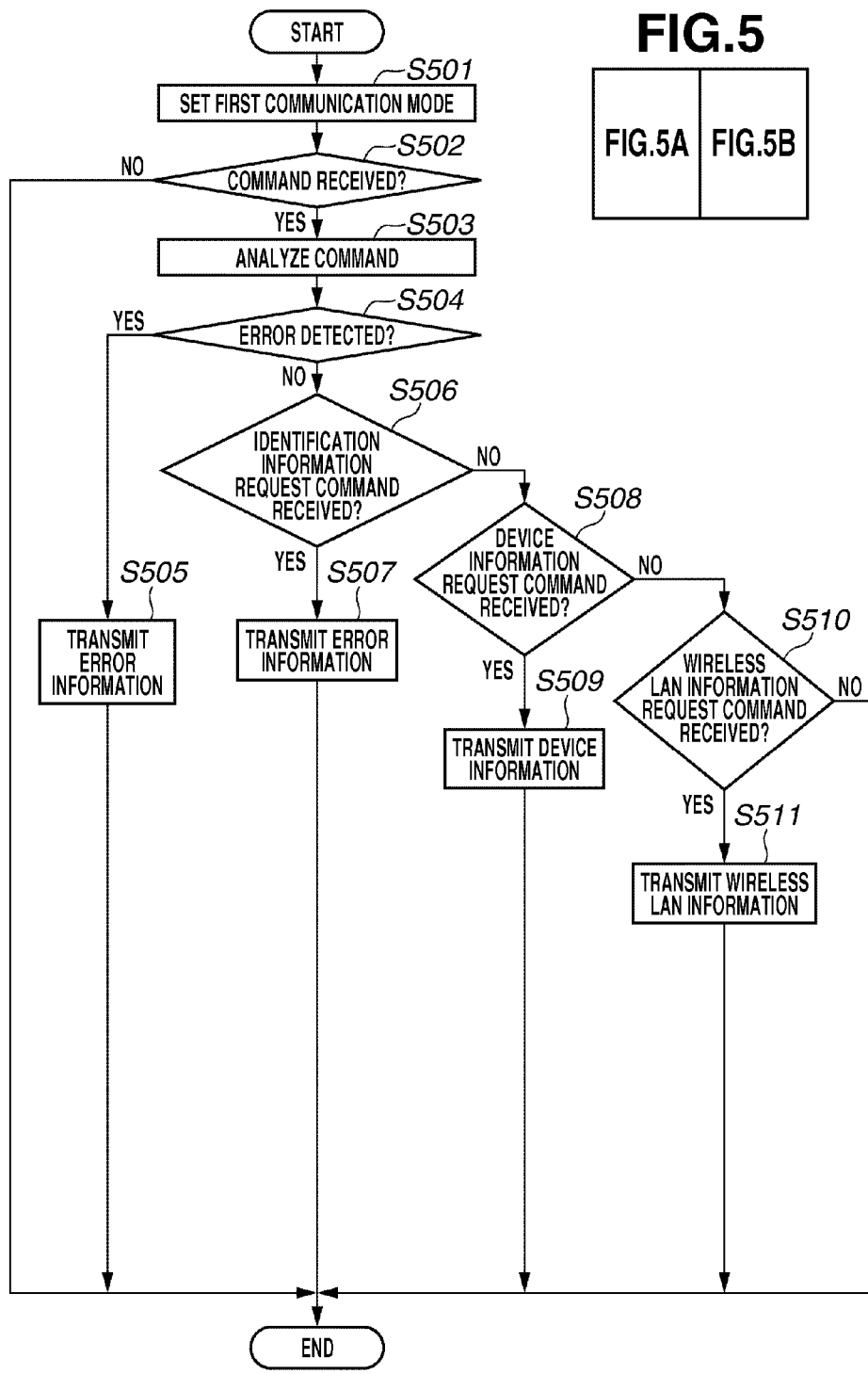

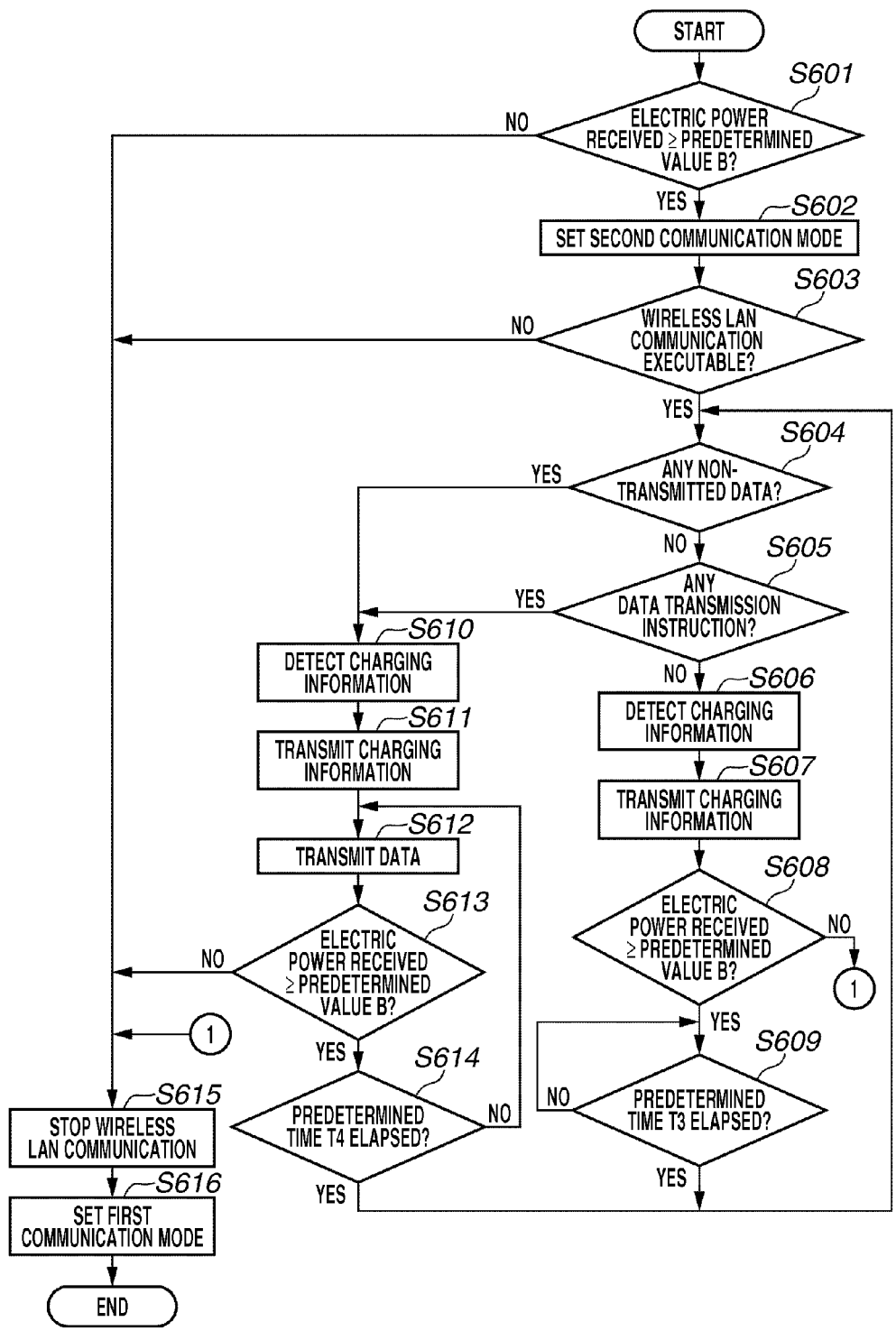

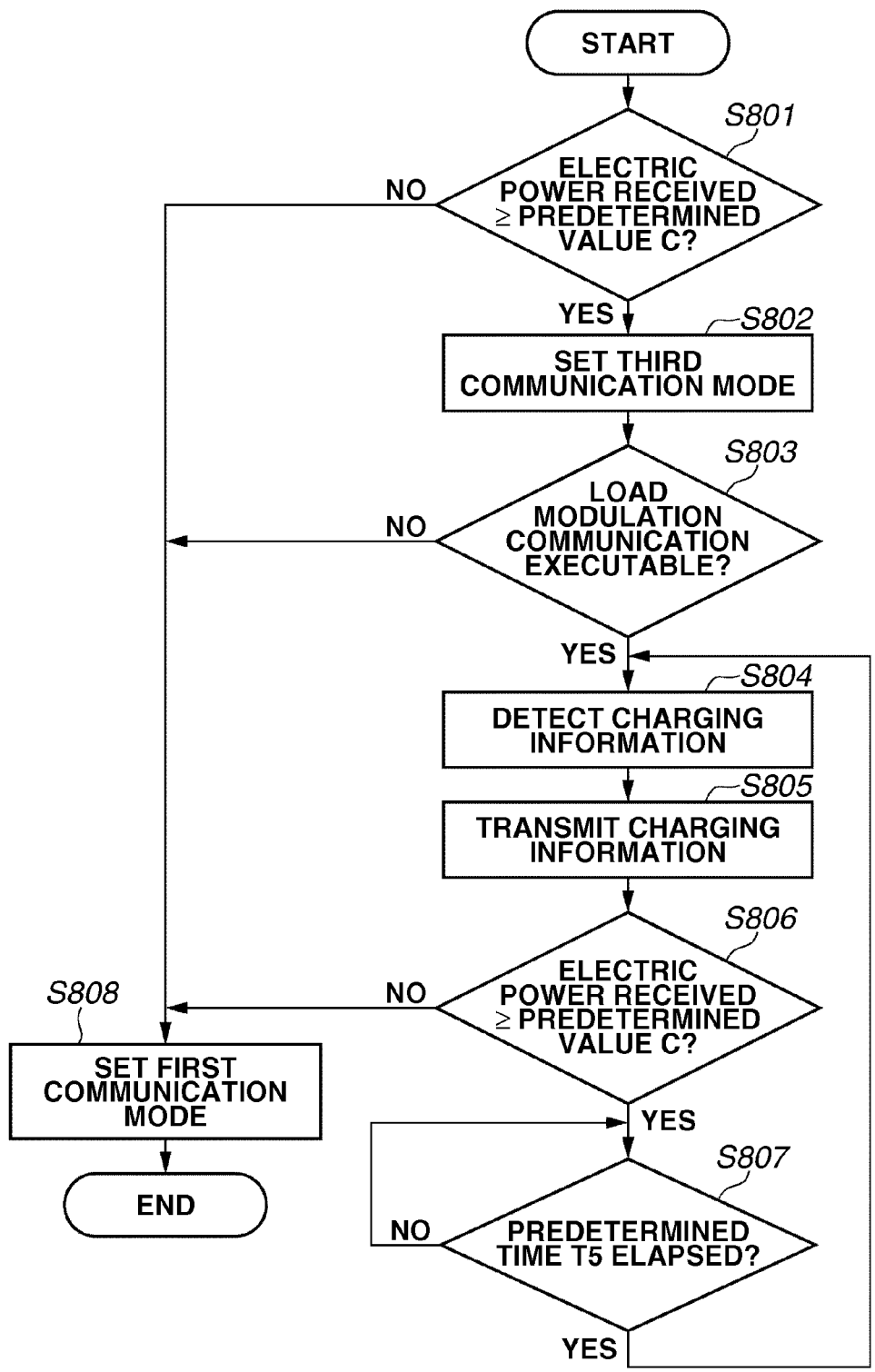

ELECTRONIC DEVICE, CONTROL METHOD, AND RECORDING MEDIUM

BACKGROUND OF THE INVENTION

1. Field of the Invention

The present invention relates to an electronic device, a control method, and a recording medium.

2. Description of the Related Art

In a conventional system including a power supply apparatus and an electronic device, the power supply apparatus supplies electric power wirelessly (without connecting a connector) to the electronic device and the electronic device charges a battery while the electric power is supplied wirelessly from the power supply apparatus. For example, as discussed in Japanese Patent Application Laid-Open No. 2008-113519, it is conventionally known that the power supply apparatus uses the same antenna to transmit a command to the electronic device (for data communication) and to transmit electric power to the electronic device (for power supply).

According to a conventional power supply apparatus, a command instructing charging is transmitted to an electronic device and, if a response is received from the electronic device, an output resistance of the power supply apparatus is lowered to output charging power that enables the electronic device to charge a battery.

However, if the power supply apparatus transmits a command again to the electronic device in a state where the power supply apparatus is supplying charging power to the electronic device, the power supply apparatus is required to control the output resistance of the power supply apparatus in such a way as to restore the previous (pre-charging) state so that the command can be surely transmitted to the electronic device.

In other words, the power supply apparatus cannot communicate with the electronic device when the power supply apparatus is supplying charging power to the electronic device. Therefore, it was unfeasible to confirm the state of the electronic device and control the electronic device by transmitting a command. Thus, the power supply apparatus cannot appropriately control the electric power to be supplied to the electronic device in the state where the charging power is supplied to the electronic device.

SUMMARY OF THE INVENTION

According to an aspect of the present invention, there is provided an electronic device that includes a power receiving unit that can receive power wirelessly from a power supply apparatus, a first unit that can transmit first information to the power supply apparatus in response to a command received from the power supply apparatus, wherein the first information indicates a status of the electronic device, a second unit that transmits second information to the power supply apparatus, wherein the second information indicates a status of the electronic device, and a control unit that controls the first unit or the second unit in such a way as to transmit at least one of the first information and the second information to the power supply apparatus based on the power received from the power supply apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating an example of communication process that can be performed by the electronic device according to the first exemplary embodiment of the present invention.

FIG. 8 is a flowchart illustrating an example of the communication process that can be performed by the electronic device according to the second exemplary embodiment of the present invention.

DESCRIPTION OF THE EMBODIMENTS

Various exemplary embodiments, features, and aspects of the invention will be described in detail below with reference to the drawings.

Figure 1:
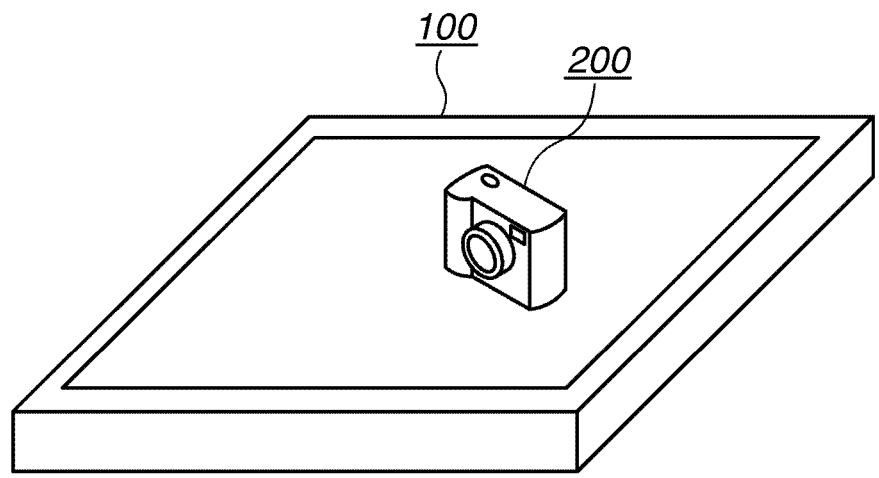
FIG. 1 illustrates an example of a power supply system according to a first exemplary embodiment of the present invention.

A first exemplary embodiment of the present invention is described in detail below with reference to attached drawings. A power supply system according to a first exemplary embodiment includes a power supply apparatus 100 and an electronic device 200 as illustrated in FIG. 1. In the power supply system according to the first exemplary embodiment, the power supply apparatus 100 can supply electric power wirelessly to the electronic device 200 via a power supply antenna 108, for example, when the electronic device 200 is placed on the power supply apparatus 100 as illustrated in FIG. 1.

Further, in a state where the distance between the power supply apparatus 100 and the electronic device 200 is in a predetermined range, the electronic device 200 including a power receiving antenna 201 can receive electric power wirelessly from the power supply apparatus 100 via the power receiving antenna 201.

Further, the electronic device 200 can charge a battery 210 attached to the electronic device 200 while electric power is received from the power supply apparatus 100 via the power receiving antenna 201. Further, in a state where the distance between the power supply apparatus 100 and the electronic device 200 is not in the predetermined range, the electronic device 200 cannot receive electric power from the power supply apparatus 100 via the power receiving antenna 201.

The above-described predetermined range is a range in which the electronic device 200 can communicate while electric power is supplied from the power supply apparatus 100.

In the present exemplary embodiment, the power supply apparatus 100 can supply electric power wirelessly to a plurality of electronic devices, simultaneously.

The electronic device 200 can be any electronic device that can perform various operations when electric power is supplied from the battery 210. For example, the electronic device 200 is an image capture apparatus (e.g., a digital still camera, a camera-equipped portable telephone, a digital video camera, or the like) or a reproduction apparatus (e.g., a player) that can reproduce audio data and video data. Further, the electronic device 200 can be a mobile apparatus, such as an automotive vehicle, which can be operated by an electric motor while electric power is supplied from the battery 210.

Further, the electronic device 200 can be an electronic device capable of performing various operations while electric power is supplied from the power supply apparatus 100 even when the battery 210 is not attached to the electronic device 200.

Figure 2:
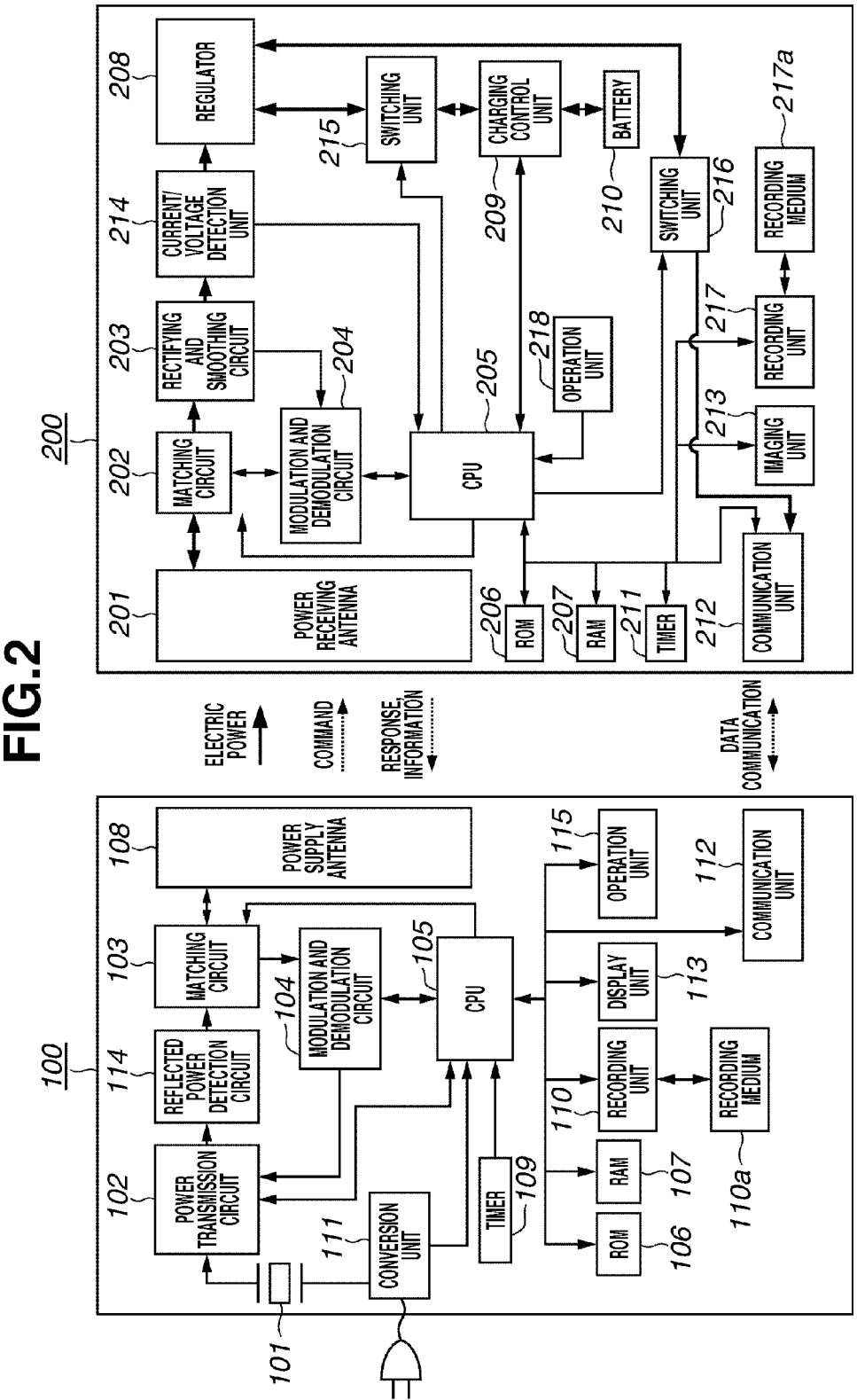
FIG. 2 is a block diagram illustrating an example of the power supply system according to the first exemplary embodiment of the present invention.

FIG. 2 is a block diagram illustrating the power supply system that includes the power supply apparatus 100 and the electronic device 200.

As illustrated in FIG. 2, the power supply apparatus 100 includes an oscillator 101, a power transmission circuit 102, a matching circuit 103, a modulation and demodulation circuit 104, a central processing unit (CPU) 105, a read only memory (ROM) 106, a random access memory (RAM) 107, the power supply antenna 108, a timer 109, a recording unit 110, and a conversion unit 111. Further, as illustrated in FIG. 2, the power supply apparatus 100 includes a communication unit 112, a display unit 113, a reflected power detection circuit 114, and an operation unit 115.

The oscillator 101 can generate frequency oscillation that can be used to control the power transmission circuit 102 in such a way as to convert electric power supplied from an AC power source (not illustrated) via the conversion unit 111 to the power transmission circuit 102 into electric power corresponding to a target value set by the CPU 105. For example, the oscillator 101 is a quartz oscillator.

The power transmission circuit 102 can generate electric power to be supplied to the electronic device 200 via the power supply antenna 108 based on the electric power supplied from the conversion unit 111 and the oscillation frequency generated by the oscillator 101. The power transmission circuit 102 includes an internal field effect transistor (FET), and generates the electric power to be supplied to the electronic device 200 by controlling the current flowing between source and drain terminals of the internal FET according to the oscillation frequency of the oscillator 101. The electric power generated by the power transmission circuit 102 is supplied to the matching circuit 103 via the reflected power detection circuit 114.

Further, the electric power generated by the power transmission circuit 102 includes first electric power and second electric power.

The first electric power is electric power to be required when the power supply apparatus 100 transmits a control command to the electronic device 200. The second electric power is electric power to be supplied to the electronic device 200 when the power supply apparatus 100 supplies electric power to the electronic device 200. For example, the first electric power is less than or equal to 1 W. The second electric power is within a range of 2 W to 10 W. In the present exemplary embodiment, the second electric power can be equal to or greater than 10 W.

In the present exemplary embodiment, the first electric power is lower than the second electric power.

When the power supply apparatus 100 is supplying the first electric power to the electronic device 200, the power supply apparatus 100 can transmit a command to the electronic device 200 via the power supply antenna 108. However, when the power supply apparatus 100 is supplying the second electric power to the electronic device 200, the power supply apparatus 100 cannot transmit a command to the electronic device 200 via the power supply antenna 108.

The first electric power is an electric power that can be set by the CPU 105 so that the power supply apparatus 100 can supply a command to any apparatus other than the electronic device 200 via the power supply antenna 108.

The CPU 105 controls the power transmission circuit 102 in such a way as to switch the electric power to be supplied to the electronic device 200 to either the first electric power or the second electric power.

The matching circuit 103 is a resonance circuit that causes the power supply antenna 108 to resonate with a power receiving antenna of a power supply target apparatus selected by the CPU 105 at the oscillation frequency of the oscillator 101.

The matching circuit 103 includes circuit elements, such as a variable capacitor, a variable coil, and a resistor. The matching circuit 103 performs impedance matching between the power transmission circuit 102 and the power supply antenna 108 using the above-described circuit elements.

The CPU 105 controls setting values of a variable capacitor (not illustrated) and a variable coil (not illustrated) to set the oscillation frequency of the oscillator 101 to a resonance frequency f. The resonance frequency f is a frequency at which the power supply apparatus 100 resonates with a target apparatus to which the power supply apparatus 100 supplies electric power.

The frequency at which the power supply apparatus 100 resonates with the power supply target of the power supply apparatus 100 is hereinafter referred to as "resonance frequency f."

The following numerical formula (I) defines the resonance frequency f, in which L represents an inductance value of the matching circuit 103 and C represents a capacitance value of the matching circuit 103.

$$f = \frac{1}{2\pi\sqrt{LC}} \tag{1}$$

In the present exemplary embodiment, the CPU 105 sets the oscillation frequency of the oscillator 101 to the resonance frequency f by controlling the values of the variable capacitor (not illustrated) and the variable coil (not illustrated).

The resonance frequency f can be the commercial frequency (i.e., 50/60 Hz) or can be any frequency within a range of 10 kHz to several hundreds kHz, or can be a higher frequency of about 10 MHz.

Further, the matching circuit 103 can detect a change of the current flowing to the power supply antenna 108 and a change of the voltage supplied to the power supply antenna 108.

In a state where the oscillation frequency of the oscillator 101 is set to be equal to the resonance frequency f, the electric power generated by the power transmission circuit 102 is supplied to the power supply antenna 108 via the matching circuit 103.

The modulation and demodulation circuit 104 modulates the electric power generated by the power transmission circuit 102 according to a predetermined protocol to transmit an electronic device command to the electronic device 200. The predetermined protocol is, for example, a communication protocol that conforms to ISO/IEC 18092 standards, such as Radio Frequency IDentification (RFID).

Further, the predetermined protocol can be a communication protocol that conforms to Near Field Communication (NFC) standards. The modulation and demodulation circuit 104 converts the electric power generated by the power transmission circuit 102 into a pulse signal, as a command to be used to communicate with the electronic device 200, and transmits the pulse signal to the electronic device 200 via the power supply antenna 108.

The electronic device 200 analyzes the pulse signal transmitted from the power supply apparatus 100 and detects a bit data including "1" information and "0" information. The command includes identification information required to identify an address and a command code indicating an operation to be instructed by the command. The CPU 105 can transmit a command exclusively to the electronic device 200 by controlling the modulation and demodulation circuit 104 in such a way as to change the identification information included in the command.

Further, the CPU 105 can transmit a command to the electronic device 200 and to an apparatus other than the electronic device 200 by controlling the modulation and demodulation circuit 104 in such a way as to change the identification information included in the command.

The modulation and demodulation circuit 104 converts the electric power generated by the power transmission circuit 102 into a pulse signal based on Amplitude Shift Keying (ASK) modulation (i.e., amplitude variation based modulation). The ASK modulation is employable for an IC card and a card reader that can communicate with the IC card wirelessly.

The modulation and demodulation circuit 104 changes the amplitude of the electric power generated by the power transmission circuit 102 by switching an analog multiplier and a load resistance included in the modulation and demodulation circuit 104. Thus, the modulation and demodulation circuit 104 changes the electric power generated by the power transmission circuit 102 into a pulse signal. The pulse signal changed by the modulation and demodulation circuit 104 is supplied to the power supply antenna 108 and transmitted, as a command, to the electronic device 200.

Further, the modulation and demodulation circuit 104 includes an encoding circuit that is operable according to a predetermined encoding method.

The modulation and demodulation circuit 104 can cause the encoding circuit to demodulate a response received from the electronic device 200 responding to the command transmitted to the electronic device 200 or information received from the electronic device 200, in response to a change of the current flowing to the power supply antenna 108 that can be detected by the matching circuit 103. Thus, the modulation and demodulation circuit 104 can receive, from the electronic device 200, the response replying to the command transmitted to the electronic device 200 or the information received from the electronic device 200 according to a load modulation method.

The modulation and demodulation circuit 104 transmits a command to the electronic device 200 according to an instruction from the CPU 105. Further, if a response or information is received from the electronic device 200, the modulation and demodulation circuit 104 demodulates the received response or information and supplies the demodulated response or information to the CPU 105.

In a state where the AC power source (not illustrated) is connected to the power supply apparatus 100, the CPU 105 can control each unit of the power supply apparatus 100 while electric power is supplied from the AC power source (not illustrated) via the conversion unit 111. Further, the CPU 105 can execute a computer program stored in the ROM 106 to control operations to be performed by respective units of the power supply apparatus 100. The CPU 105 can control the electric power to be supplied to the electronic device 200 by controlling the power transmission circuit 102. Further, the CPU 105 can transmit a command to the electronic device 200 by controlling the modulation and demodulation circuit 104.

The ROM 106 stores the computer program required to control operations to be performed by respective units of the power supply apparatus 100 and parameters relating to the operations of respective units. Further, the ROM 106 can store video data to be displayed on the display unit 113.

The RAM 107 is a rewritable nonvolatile memory, which can temporarily store the computer program required to control operations to be performed by respective units of the power supply apparatus 100, parameters relating to the operations of respective units, and information received from the electronic device 200 via the modulation and demodulation circuit 104.

The power supply antenna 108 is an antenna that can output the electric power generated by the power transmission circuit 102 to an external device.

The power supply apparatus 100 supplies electric power to the electronic device 200 via the power supply antenna 108 and transmits a command to the electronic device 200 via the power supply antenna 108. Further, the power supply apparatus 100 receives a command from the electronic device 200 via the power supply antenna 108, a response replying to a command transmitted to the electronic device 200, and information transmitted from the electronic device 200.

The timer 109 measures the time and can obtain time information relating to operations or processing performed by respective units. Further, a threshold value applicable to the time measured by the timer 109 is stored beforehand in the ROM 106.

The recording unit 110 records video data and audio data on a recording medium 110a if these data are received by the communication unit 112.

Further, the recording unit 110 can read the recorded data (i.e., video data and audio data) from the recording medium 110a and can supply readout data to the RAM 107, the communication unit 112, and the display unit 113.

For example, the recording medium 110a is a hard disk or a memory card, and can be a built-in medium provided in the power supply apparatus 100 or an external recording medium that is attachable to or detachable from the power supply apparatus 100.

In a state where the AC power source (not illustrated) is connected to the power supply apparatus 100, the conversion unit 111 can convert alternating-current power supplied from the AC power source (not illustrated) into direct-current power and can supply the converted direct-current power to each unit of the power supply apparatus 100.

The communication unit 112 can transmit video data and audio data to the electronic device 200 if these data are supplied from any one of the RAM 107 and the recording medium 110a. Further, the communication unit 112 can receive video data and audio data transmitted from the electronic device 200 to the power supply apparatus 100.

The communication unit 112 can perform wireless communications based on wireless communication method, such as 802.11a,b,g,n standards regulated according to the wireless LAN standards. Further, in the transmission or reception of the video data or the audio data, the communication unit 112 can modulate the data into a signal conforming to the wireless LAN standards.

The communication unit 112 can receive video data and audio data from the electronic device 200 or can transmit video data and audio data to the electronic device 200 in a state where the modulation and demodulation circuit 104 is transmitting a command to the electronic device 200 via the power supply antenna 108. Further, the communication unit 112 can receive video data and audio data from the electronic device 200 or can transmit video data and audio data to the electronic device 200 in a state where the modulation and demodulation circuit 104 is receiving a response or information transmitted from the electronic device 200 via the power supply antenna 108.

Further, the communication unit 112 can transmit a signal or data required to control the electronic device 200 from the power supply apparatus 100 to the electronic device 200. Further, the communication unit 112 can receive data or a signal transmitted from the electronic device 200 to the power supply apparatus 100.

The display unit 113 can display any one of video data read from the recording medium 110a via the recording unit 110, video data supplied from the RAM 107, video data supplied from the ROM 106, and video data supplied from the communication unit 112. The display unit 113 can display video data read from the recording medium 110a and can display icons and menu screens stored beforehand in the ROM 106.

The reflected power detection circuit 114 can detect information indicating an amplitude voltage V1 of a traveling wave of the electric power having been output from the power supply antenna 108 and information indicating an amplitude voltage V2 of a reflected wave of the electric power having been output from the power supply antenna 108.

The information detected by the reflected power detection circuit 114 (i.e., the information indicating the amplitude voltage V1 and the information indicating the amplitude voltage V2) is supplied to the CPU 105.

The CPU 105 stores the information supplied from the reflected power detection circuit 114 (i.e., the information indicating the amplitude voltage V1 and the information indicating the amplitude voltage V2) in the RAM 107.

The CPU 105 calculates a voltage standing wave ratio (VSWR) based on the amplitude voltage V1 of the traveling wave and the amplitude voltage V2 of the reflected wave. In the present exemplary embodiment, the voltage standing wave ratio (VSWR) is simply referred to as "VSWR." The VSWR is a value indicating a relationship between the traveling wave of the electric power output via the power supply antenna 108 and the reflected wave of the electric power output via the power supply antenna 108. When the VSWR value is equal to 1, the reflected power is small and the loss of the electric power supplied from the power supply apparatus 100 to an external electronic device is small, and the efficiency is high.

The CPU 105 determines whether the electronic device 200 is present near the power supply apparatus 100 with reference to the calculated VSWR value.

The operation unit 115 provides a user interface that enables users to operate the power supply apparatus 100. The operation unit 115 includes a power button for the power supply apparatus 100 and a mode switch button for the power supply apparatus 100. Each button can be constituted by a switch, a touch panel, or the like. The CPU 105 controls the power supply apparatus 100 according to a user instruction that can be input via the operation unit 115. In the present exemplary embodiment, the operation unit 115 can be configured to control the power supply apparatus 100 according to a remote-control signal received from a remote controller (not illustrated).

Further, the power supply apparatus 100 can include a speaker unit (not illustrated). The speaker unit (not illustrated) can output any one of audio data read from the recording medium 110a via the recording unit 110, audio data supplied from the ROM 106, audio data supplied from the RAM 107, and audio data supplied from the communication unit 112.

Next, an example configuration of the electronic device 200 is described below with reference to FIG. 2.

In the following description, a digital still camera is an example of the electronic device 200.

The electronic device 200 includes the power receiving antenna 201, a matching circuit 202, a rectifying and smoothing circuit 203, a modulation and demodulation circuit 204, a CPU 205, a ROM 206, a RAM 207, a regulator 208, a charging control unit 209, the battery 210, and a timer 211. Further, the electronic device 200 includes a communication unit 212, an imaging unit 213, a current and voltage detection unit 214, a switching unit 215, a switching unit 216, a recording unit 217, and an operation unit 218.

The power receiving antenna 201 is an antenna that can receive electric power supplied from the power supply apparatus 100. The electronic device 200 can receive electric power and can receive a command from the power supply apparatus 100 via the power receiving antenna 201. Further, the electronic device 200 can transmit a control command to the power supply apparatus 100, or can transmit a response and predetermined information that reply to a command received from the power supply apparatus 100, via the power receiving antenna 201.

The matching circuit 202 is a resonance circuit that can perform impedance matching in such a way as to cause the power receiving antenna 201 to resonate at a frequency similar to the resonance frequency f of the power supply apparatus 100. Similar to the matching circuit 103, the matching circuit 202 includes a capacitor, a coil, a variable capacitor, a variable coil, and a resistor. The matching circuit 202 controls a capacitance value of the variable capacitor, an inductance value of the variable coil, and an impedance value of the variable resistance in such a way as to cause the power receiving antenna 201 to resonate at the frequency similar to the resonance frequency f of the power supply apparatus 100.

Further, the matching circuit 202 can supply electric power received via the power receiving antenna 201 to the rectifying and smoothing circuit 203.

The rectifying and smoothing circuit 203 can generate direct-current power, while extracting a command and removing noise components from the electric power received via the power receiving antenna 201. Further, the rectifying and smoothing circuit 203 can supply the generated direct-current power to the regulator 208 via the current and voltage detection unit 214. The rectifying and smoothing circuit 203 supplies a command, if it is extracted from the electric power received via the power receiving antenna 201, to the modulation and demodulation circuit 204.

The rectifying and smoothing circuit 203 includes rectifying diodes to generate direct-current power through full-wave rectification or half-wave rectification. The direct-current power generated by the rectifying and smoothing circuit 203 can be supplied to the regulator 208.

The modulation and demodulation circuit 204 analyzes the command supplied from the rectifying and smoothing circuit 203 according to communication protocols determined beforehand in relation to the power supply apparatus 100, and supplies a command analysis result to the CPU 205.

In a state where electric power is supplied from the power supply apparatus 100 to the electronic device 200, the CPU 205 controls the modulation and demodulation circuit 204 in such a way as to change a load included in the modulation and demodulation circuit 204 to transmit a command, a response replying to a command, and predetermined information to the power supply apparatus 100. When the load included in the modulation and demodulation circuit 204 changes, the current flowing to the power supply antenna 108 changes correspondingly. Thus, the power supply apparatus 100 can receive a command, a response replying to a command, and predetermined information, if they are transmitted from the electronic device 200, by detecting a change of the current flowing to the power supply antenna 108.

The CPU 205 identifies the command received by the modulation and demodulation circuit 204 with reference to the analysis result supplied from the modulation and demodulation circuit 204 and controls the electronic device 200 in such a way as to perform an operation or processing designated by a command code that corresponds to the received command.

Further, the CPU 205 executes a computer program stored in the ROM 206 to control operations of respective units of the electronic device 200.

The ROM 206 stores the computer program required to control operations of respective units of the electronic device 200 and parameters relating to the operations of respective units of the electronic device 200. Further, the ROM 206 stores identification information of the electronic device 200, device information of the electronic device 200, and display data. The identification information of the electronic device 200 indicates ID of the electronic device 200. The device information of the electronic device 200 includes manufacturer name of the electronic device 200, device name of the electronic device 200, manufacturing year/month/day of the electronic device 200, communication ability information of the electronic device 200, and power receiving information of the electronic device 200.

The communication ability information of the electronic device 200 is information indicating a communication method that is adaptable to the electronic device 200. In a case where the electronic device 200 includes a transmission unit that can transmit a command, predetermined information, or a response signal to the power supply apparatus 100 via the power receiving antenna 201, the communication ability information indicates that the electronic device 200 performs communications according to load modulation. In a case where the communication unit 212 of the electronic device 200 can transmit a command, predetermined information, or a response signal to the power supply apparatus 100, the communication ability information indicates that the electronic device 200 performs communications via the communication unit 212.

For example, in a case where the communication unit 212 is operable in compliance with wireless LAN standards, the communication ability information indicates that the electronic device 200 communicates with other devices via the wireless LAN. If the communication unit 212 is operable in compliance with wireless LAN standards in a state where the electronic device 200 can transmit predetermined information or a response signal to the power supply apparatus 100 via the power receiving antenna 201, the communication ability information indicates that the electronic device 200 communicates with other devices by using load modulation or via the wireless LAN.

The power receiving information of the electronic device 200 includes information indicating electric power that the electronic device 200 can receive, information indicating electric power required when the electronic device 200 operates the communication unit 212, and information indicating electric power required when the electronic device 200 performs a charging operation.

The RAM 207 is a rewritable nonvolatile memory that can temporarily store the computer program required to control operations to be performed by respective units of the electronic device 200, parameters relating to the operations of respective units, and information received from the power supply apparatus 100.

The regulator 208 controls any one of the voltage of the direct-current power supplied from the rectifying and smoothing circuit 203 and the voltage of the electric power supplied from the battery 210 to be equal to the voltage value having been set by the CPU 205. The regulator 208 can be a switching regulator or a linear regulator.

In a state where electric power can be supplied from the power supply apparatus 100 to any one of the first electric power and the second electric power although no electric power is supplied from the battery 210, the regulator 208 supplies the direct-current power from the rectifying and smoothing circuit 203 to various units of the electronic device 200. In this case, the regulator 208 supplies the direct-current power from the rectifying and smoothing circuit 203 to the charging control unit 209 and the battery 210 via the switching unit 215. In this case, the regulator 208 supplies the direct-current power from the rectifying and smoothing circuit 203 to the communication unit 212 via the switching unit 216.

In a state where electric power can be supplied from the battery 210 via the switching unit 215 although any one of the first electric power and the second electric power is not supplied from the power supply apparatus 100, the regulator 208 supplies the electric power supplied from the battery 210 to various units of the electronic device 200.

In a state where electric power can be supplied from the power supply apparatus 100 and the battery 210, the regulator 208 supplies the direct-current power from the rectifying and smoothing circuit 203 to various units of the electronic device 200.

In a state where electric power is supplied from at least one of the battery 210 and the power supply apparatus 100, the regulator 208 causes the supplied direct-current power to be further supplied to the CPU 205, the ROM 206, the RAM 207, and the timer 211. Further, in a state where electric power is supplied from at least one of the battery 210 and the power supply apparatus 100, the regulator 208 causes the supplied electric power to be further supplied to the modulation and demodulation circuit 204, the matching circuit 202, the rectifying and smoothing circuit 203, and the current and voltage detection unit 214.

In a state where electric power is supplied from the regulator 208 via the switching unit 215, the charging control unit 209 charges the battery 210 by using the supplied electric power. In this case, the charging control unit 209 charges the battery 210 according to a constant-voltage and constant-current method. Further, the charging control unit 209 periodically detects information relating to the charging of the battery 210 and supplies the detected information to the CPU 205.

The information relating to the charging of the battery 210 is hereinafter referred to as "charging information."

The CPU 205 stores the charging information in the RAM 207.

The charging information can include remaining capacity information that indicates the remaining capacity of the battery 210 and information indicating whether the battery 210 is in a full-charge state, and may further include information indicating the time elapsed since the charging control unit 209 has started charging the battery 210.

Further, the charging information can include information indicating that the charging control unit 209 is charging the battery 210 according to a constant-voltage control and information indicating that the charging control unit 209 is charging the battery 210 according to a constant-current control. Further, the charging information may include information indicating that the charging control unit 209 is performing trickle charging for the battery 210 and information indicating that the charging control unit 209 is performing rapid charging for the battery 210.

Further, when the charging control unit 209 charges the battery 210, the charging control unit 209 detects the current flowing to the battery 210 and the voltage supplied to the battery 210. The charging control unit 209 supplies the detected current and voltage values to the CPU 205. The CPU 205 stores the information indicating the current flowing to the battery 210 and the information indicating the voltage supplied to the battery 210 in the RAM 207, which are supplied from the charging control unit 209. The CPU 205 can detect an error relating to the charging of the battery 210 with reference to the information indicating the current flowing to the battery 210 and the information indicating the voltage supplied to the battery 210, which are detected by the charging control unit 209.

The battery 210 is attachable to and detachable from the electronic device 200. Further, the battery 210 is a chargeable secondary battery, such as a lithium-ion battery. The battery 210 can supply electric power to each unit of the electronic device 200.

The timer 211 measures the time and can obtain time information relating to an operation or processing performed by each unit. Further, a threshold value applicable to the time measured by the timer 211 is stored beforehand in the ROM 206.

The communication unit 212 can transmit video data and audio data stored in the ROM 206 or recorded on a recording medium 217a to the power supply apparatus 100 and can receive video data and audio data from the power supply apparatus 100.

The communication unit 212 performs reception and transmission of video data and audio data according to communication protocols that are commonly applied to the communication unit 112. Further, for example, the communication unit 212 can transmit and receive video data and audio data according to 802.11a,b,g,n standards regulated for the wireless LAN.

The imaging unit 213 includes an image sensor that can generate video data based on an optical image of an object to be captured, an image processing circuit that can perform image processing on the video data generated by the image sensor, and a compression/decompression circuit that can compress video data and can decompress compressed video data. The imaging unit 213 performs an imaging operation to capture an image of an object, and supplies video data of a still image or a moving image obtained by the imaging operation to the recording unit 217. The recording unit 217 records the video data supplied from the imaging unit 213 on the recording medium 217a. The imaging unit 213 can further include any configuration required to perform the imaging operation.

The current and voltage detection unit 214 can detect current information indicating a current value of the electric power supplied from the rectifying and smoothing circuit 203 and voltage information indicating a voltage value of the electric power supplied from the rectifying and smoothing circuit 203.

The current information and the voltage information detected by the current and voltage detection unit 214 can be supplied to the CPU 205.

The CPU 205 stores, in the RAM 207, the current information and the voltage information supplied from the current and voltage detection unit 214. Further, the CPU 205 can calculate electric power transmitted from the power supply apparatus 100 to the electronic device 200 with reference to the current information and the voltage information supplied from the current and voltage detection unit 214.

The switching unit 215 is a switch that can connect the regulator 208 to the charging control unit 209. When the CPU 205 turns on the switching unit 215, the regulator 208 is connected to the charging control unit 209. When the CPU 205 turns off the switching unit 215, the regulator 208 is disconnected from the charging control unit 209.

If the switching unit 215 is ON in a state where the operation mode of the electronic device 200 is a charging mode, the regulator 208 can supply electric power received from the rectifying and smoothing circuit 203 to the charging control unit 209 and the battery 210 via the switching unit 215. If the switching unit 215 is OFF in a state where the operation mode of the electronic device 200 is the charging mode, the regulator 208 cannot supply the electric power received from the rectifying and smoothing circuit 203 to the charging control unit 209 and the battery 210 via the switching unit 215. In the charging mode, the electronic device 200 charges the battery 210 while the electric power is supplied from the power supply apparatus 100 to the electronic device 200.

If the switching unit 215 is ON in a state where the operation mode of the electronic device 200 is other than the charging mode, the regulator 208 can receive electric power from the battery 210 via the switching unit 215.

If the switching unit 215 is OFF in a state where the operation mode of the electronic device 200 is other than the charging mode, the regulator 208 cannot receive any electric power from the battery 210 via the switching unit 215.

If the battery 210 is in the full-charge state when the operation mode of the electronic device 200 is the charging mode, the CPU 205 turns off the switching unit 215.

Further, if the CPU 205 detects that the AC power source (not illustrated) is connected to the electronic device 200 in a state where the operation mode of the electronic device 200 is a mode other than the charging mode, the CPU 205 turns off the switching unit 215. In this case, the regulator 208 receives electric power from the AC power source (not illustrated), and the regulator 208 supplies the electric power received from the AC power source (not illustrated) to various units of the electronic device 200.

The switching unit 215 can be a relay switch or can be any available switch provided beforehand in the electronic device 200.

The switching unit 216 is a switch that can connect the regulator 208 to the communication unit 212. When the CPU 205 turns on the switching unit 216, the regulator 208 is connected to the communication unit 212. When the CPU 205 turns off the switching unit 216, the regulator 208 is disconnected from the communication unit 212.

If the switching unit 216 is ON, the regulator 208 can supply the electric power received from the rectifying and smoothing circuit 203 to the communication unit 212 via the switching unit 216. If the switching unit 215 is OFF, the regulator 208 cannot supply the electric power received from the rectifying and smoothing circuit 203 to the communication unit 212 via the switching unit 216.

The switching unit 216 can be a relay switch or can be any available switch provided beforehand in the electronic device 200.

The recording unit 217 records video data and audio data supplied from any one of the communication unit 212 and the imaging unit 213 on the recording medium 217a.

Further, the recording unit 217 can read video data and audio data from the recording medium 217a and can supply the readout data to the RAM 207 and the communication unit 212.

For example, the recording medium 217a is a hard disk or a memory card, and can be a built-in medium provided in the electronic device 200, or can be an external recording medium that is attachable to or detachable from the electronic device 200.

The operation unit 218 provides a user interface that enables users to operate the electronic device 200. The operation unit 218 includes a power button that is usable to activate the electronic device 200 and a mode switch button that is usable to switch the operation mode of the electronic device 200. Each button can be constituted by a switch or a touch panel. The CPU 205 controls the electronic device 200 according to a user instruction input via the operation unit 218. The operation unit 218 can be configured to control the electronic device 200 according to a remote-control signal received from a remote controller (not illustrated).

In the present exemplary embodiment, each of the power supply antenna 108 and the power receiving antenna 201 can be a helical antenna, a loop antenna, or a planar antenna (e.g., a meander line antenna).

The operation mode of the electronic device 200 includes a first communication mode and a second communication mode.

When the electronic device 200 is operating in the first communication mode, the electronic device 200 can communicate with the power supply apparatus 100 bi-directionally via the power receiving antenna 201. When the operation mode of the electronic device 200 is the first communication mode, the electronic device 200 can receive commands and information from the power supply apparatus 100 via the power receiving antenna 201. Further, when the operation mode of the electronic device 200 is the first communication mode, the electronic device 200 can transmit a response replying to the command received from the power supply apparatus 100, via the power receiving antenna 201, to the power supply apparatus 100.

When the electronic device 200 is operating in the second communication mode, the electronic device 200 can communicate with the power supply apparatus 100 bi-directionally via the communication unit 212. When the operation mode of the electronic device 200 is the second communication mode, the electronic device 200 can receive commands and information from the power supply apparatus 100 via the communication unit 212. Further, when the operation mode of the electronic device 200 is the second communication mode, the electronic device 200 can transmit a response replying to the command received from the power supply apparatus 100, predetermined information, command, video data, and audio data to the power supply apparatus 100, via the communication unit 212.

Further, in the first exemplary embodiment, the processing to be performed by the power supply apparatus 100 can be applied to a system in which the power supply apparatus 100 supplies electric power wirelessly to the electronic device 200 by electromagnetic coupling. Similarly, in the first exemplary embodiment, the processing to be performed by the electronic device 200 can be applied to the system in which the power supply apparatus 100 supplies electric power wirelessly to the electronic device 200 by electromagnetic coupling.

Further, the present invention can be applied to a system in which an electrode serving as the power supply antenna 108 is provided on the power supply apparatus 100 while an electrode serving as the power receiving antenna 201 is provided on the electronic device 200, and the power supply apparatus 100 supplies electric power to the electronic device 200 through field coupling.

Further, the processing to be performed by the power supply apparatus 100 and the processing to be performed by the electronic device 200 can be applied to a system in which the power supply apparatus 100 supplies electric power wirelessly to the electronic device 200 by electromagnetic induction.

Further, in the first exemplary embodiment, the power supply apparatus 100 transmits electric power wirelessly to the electronic device 200 and the electronic device 200 receives electric power wirelessly from the power supply apparatus 100. However, the technical terminology "wireless" can be replaced by "contactless" or "pointless."

(Authentication Processing)

Figure 3:
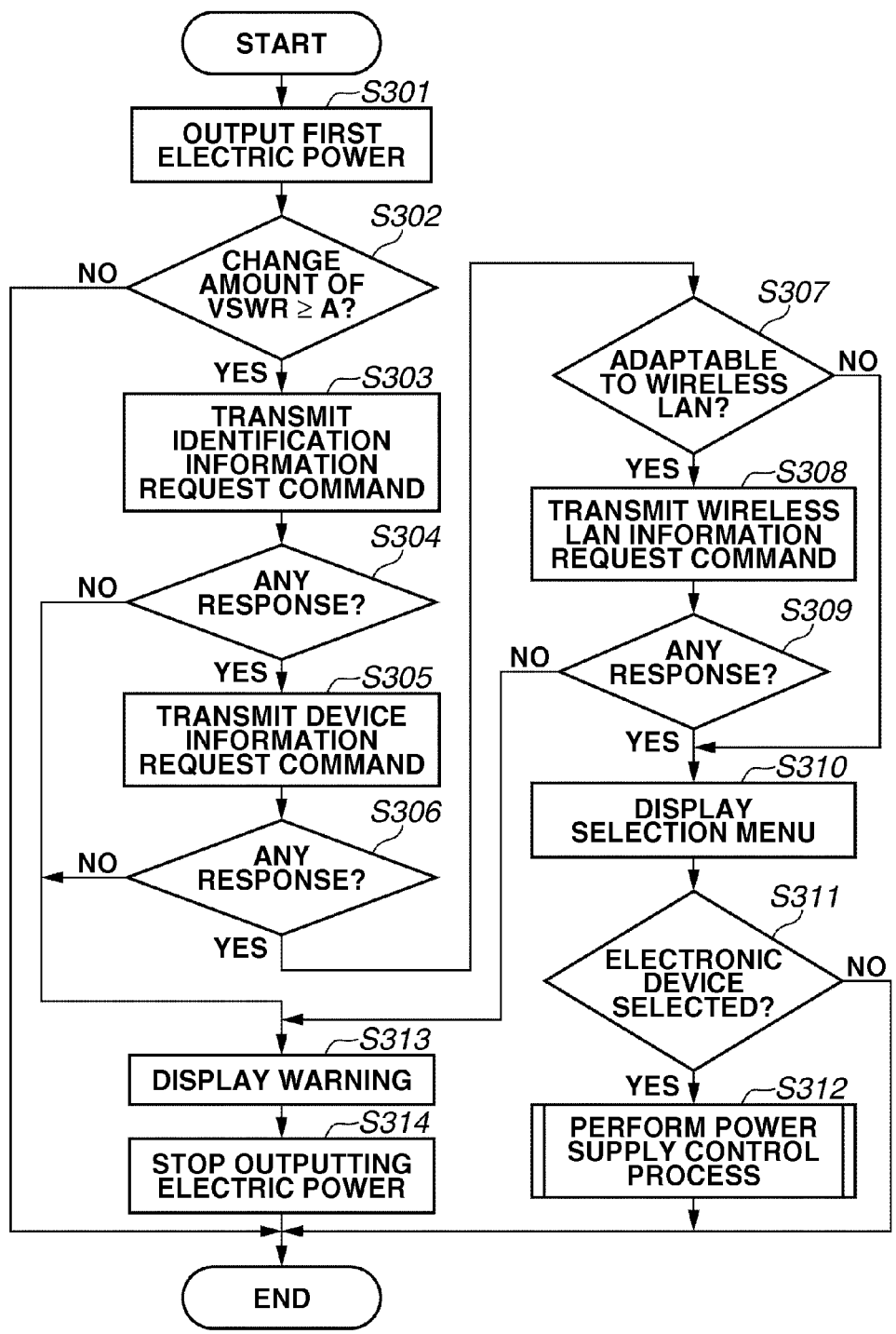
FIG. 3 is a flowchart illustrating an example of authentication process that can be performed by a power supply apparatus according to the first exemplary embodiment of the present invention.

Authentication process that can be performed by the power supply apparatus 100 is described below with reference to a flowchart illustrated in FIG. 3. The authentication process illustrated in FIG. 3 is process to be performed by the power supply apparatus 100 when the power source of the power supply apparatus 100 is ON in a state where the power supply apparatus 100 can supply electric power.

In step S301, the CPU 105 controls the oscillator 101, the power transmission circuit 102, and the matching circuit 103 in such a way as to output the first electric power to detect whether the distance between the power supply apparatus 100 and the electronic device 200 is within a predetermined range. In this case, the process of the present flowchart proceeds from step S301 to step S302. When the CPU 105 outputs the first electric power to the electronic device 200, the CPU 105 can transmit information indicating a value of the first electric power to the electronic device 200 via the power supply antenna 108.

In step S302, the CPU 105 detects a change amount M of the VSWR. The CPU 105 periodically calculates a VSWR value and calculates the change amount M of the VSWR based on the calculated VSWR value. Further, the CPU 105 determines whether the change amount M of the VSWR is equal to or greater than a predetermined value A. In the present exemplary embodiment, the predetermined value A indicates a change amount of the VSWR in a state where the electronic device 200 is placed within a predetermined range. The predetermined value A can be set by the CPU 105 or can be stored beforehand in the ROM 106.

If the CPU 105 determines that the change amount M of the VSWR is equal to or greater than the predetermined value A (Yes in step S302), the distance between the power supply apparatus 100 and the electronic device 200 is within the predetermined range. In this case (Yes in step S302), the process of the present flowchart proceeds from step S302 to step S303.

If the change amount M of the VSWR is not greater than the predetermined value A (No in step S302), the CPU 105 determines that the distance between the power supply apparatus 100 and the electronic device 200 is not within the predetermined range. In this case (No in step S302), the CPU 105 terminates the process of the flowchart illustrated in FIG. 3.

In step S303, the CPU 105 controls the modulation and demodulation circuit 104 in such a way as to transmit a first command that requests identification information of the electronic device 200 to the electronic device 200. In this case, the process of the present flowchart proceeds from step S303 to step S304.

In step S304, the CPU 105 determines whether the modulation and demodulation circuit 104 has received the identification information of the electronic device 200 as a response replying to the first command transmitted to the electronic device 200 in step S303.

If the CPU 105 determines that the modulation and demodulation circuit 104 has received the identification information of the electronic device 200 (Yes in step S304), the CPU 105 acquires the identification information of the electronic device 200 from the modulation and demodulation circuit 104 and stores the acquired identification information in the RAM 107. In this case (Yes in step S304), the process of the present flowchart proceeds from step S304 to step S305.

If the CPU 105 determines that the modulation and demodulation circuit 104 has not received the identification information of the electronic device 200 (No in step S304), the process of the present flowchart proceeds from step S304 to step S313. The determination by the CPU 105 in this case (No in step S304) is that the distance between the power supply apparatus 100 and the electronic device 200 is not within the predetermined range.

In step S305, the CPU 105 controls the modulation and demodulation circuit 104 in such a way as to transmit a second command that requests device information of the electronic device 200 to the electronic device 200. In this case, the process of the present flowchart proceeds from step S305 to step S306.

In step S306, the CPU 105 determines whether the modulation and demodulation circuit 104 has received the device information of the electronic device 200 as a response replying to the second command transmitted to the electronic device 200 in step S305.

If the CPU 105 determines that the modulation and demodulation circuit 104 has received the device information of the electronic device 200 (Yes in step S306), the CPU 105 acquires the device information of the electronic device 200 from the modulation and demodulation circuit 104 and stores the acquired device information in the RAM 107. In this case (Yes in step S306), the process of the present flowchart proceeds from step S306 to step S307.

If the CPU 105 determines that the modulation and demodulation circuit 104 has not received the device information of the electronic device 200 (No in step S306), the process of the present flowchart proceeds from step S306 to step S313. The determination by the CPU 105 in this case (No in step S306) is that the distance between the power supply apparatus 100 and the electronic device 200 is not within the predetermined range.

In step S307, the CPU 105 determines whether the electronic device 200 can perform a communication according to the wireless LAN by using the device information of the electronic device 200 acquired in step S306. For example, the CPU 105 detects a communication method applicable to the communication unit 212 of the electronic device 200 by analyzing the communication ability information of the electronic device 200 included in the device information of the electronic device 200 acquired in step S306.

Further, the CPU 105 determines whether the detected communication method applicable to the communication unit 212 coincides with a communication method applicable to the communication unit 112. If the communication method applicable to the communication unit 212 coincides with the communication method applicable to the communication unit 112, the CPU 105 determines that the electronic device 200 can perform a communication according to the wireless LAN. If the communication method applicable to the communication unit 212 does not coincide with the communication method applicable to the communication unit 112, the CPU 105 determines that the electronic device 200 cannot perform a communication according to the wireless LAN.

If the CPU 105 determines that the electronic device 200 can perform a communication according to the wireless LAN (Yes in step S307), the process of the present flowchart proceeds from step S307 to step S308. If the CPU 105 determines that the electronic device 200 cannot perform a communication according to the wireless LAN (No in step S307), the process of the present flowchart proceeds from step S307 to step S310.

In step S308, the CPU 105 controls the modulation and demodulation circuit 104 in such a way as to transmit a third command that requests information required to perform the wireless LAN communication to the electronic device 200. In this case, the process of the present flowchart proceeds from step S308 to step S309.

In step S309, the CPU 105 determines whether the modulation and demodulation circuit 104 has received the information required to perform the wireless LAN communication, as a response replying to the third command transmitted to the electronic device 200 in step S308, from the electronic device 200. The information required to perform the wireless LAN communication is, for example, Service Set Identifier (SSID) or MAC address.

If the CPU 105 determines that the modulation and demodulation circuit 104 has received the information required to perform the wireless LAN communication from the electronic device 200 (Yes in step S309), the CPU 105 stores the information required to perform the wireless LAN communication having been received from the electronic device 200 in the RAM 107. In this case (Yes in step S309), the process of the present flowchart proceeds from step S309 to step S310.

If the CPU 105 determines that the modulation and demodulation circuit 104 has not received the information required to perform the wireless LAN communication from the electronic device 200 (No in step S309), the process of the present flowchart proceeds from step S309 to step S313.

In step S310, the CPU 105 controls the display unit 113 in such a way as to display a selection menu that enables users to select a power supply target apparatus. In this case, the process of the present flowchart proceeds from step S310 to step S311. The selection menu includes information indicating the electronic device 200. If the process in step S301 to step S309 has been already performed for an apparatus other than the electronic device 200, the power supply apparatus 100 causes the display unit 113 to display a selection menu that includes information indicating the apparatus other than the electronic device 200 in addition to the information indicating the electronic device 200.

In step S311, the CPU 105 determines whether the power supply target for which the power supply process is prioritized has been selected with reference to a user instruction input via the operation unit 115. The CPU 105 stores information indicating that the power supply process is performed for an electronic device selected according to the user instruction input via the operation unit 115 in the RAM 107. If the power supply target for which the power supply process is prioritized has been selected (Yes in step S311), the CPU 105 controls the matching circuit 103 in such a way as to enable a power receiving antenna of the electronic device selected as the power supply target for which the power supply processing is prioritized to resonate with the power supply antenna 108.

If the apparatus having been selected as the power supply target for which the power supply processing is prioritized is the electronic device 200, the CPU 105 controls the matching circuit 103 in such a way as to enable the power supply antenna 108 to resonate with the power receiving antenna 201. In this case, the process of the present flowchart proceeds from step S311 to step S312. If the power supply target for which the power supply processing is prioritized has not been selected (No in step S311), the CPU 105 terminates the process of the flowchart illustrated in FIG. 3.

In step S312, the CPU 105 performs power supply control process. The power supply control process according to the present exemplary embodiment is described below. If the power supply control process has been completed, the CPU 105 terminates the process of the flowchart illustrated in FIG. 3.

In step S313, the CPU 105 controls the display unit 113 in such a way as to display warning data.

The warning data can be notification data that notifies a user that the distance between the power supply apparatus 100 and the electronic device 200 is not within the predetermined range. Further, the warning data can be notification data that notifies a user that the power supply apparatus 100 stops supplying electric power.

After the warning data is displayed on the display unit 113, the process of the present flowchart proceeds from step S313 to step S314.

In step S314, the CPU 105 controls any one of the oscillator 101, the power transmission circuit 102, and the matching circuit 103 in such a way as to stop supplying electric power to the electronic device 200. In a case where the first electric power is generated by the power transmission circuit 102, the CPU 105 controls any one of the oscillator 101, the power transmission circuit 102, and the matching circuit 103 in such a way as to stop transmitting the first electric power.

Further, in a case where the second electric power is generated by the power transmission circuit 102, the CPU 105 controls any one of the oscillator 101, the power transmission circuit 102, and the matching circuit 103 in such a way as to stop transmitting the second electric power.

In this case, the CPU 105 terminates the process of the flowchart illustrated in FIG. 3.

The first electric power supplied to the electronic device 200 in step S301 is continuously supplied from the power supply apparatus 100 to the electronic device 200 via the power supply antenna 108 until the CPU 105 stops supplying electric power to the electronic device 200 in step S313.
(Power Supply Control Process)

Figure 4:
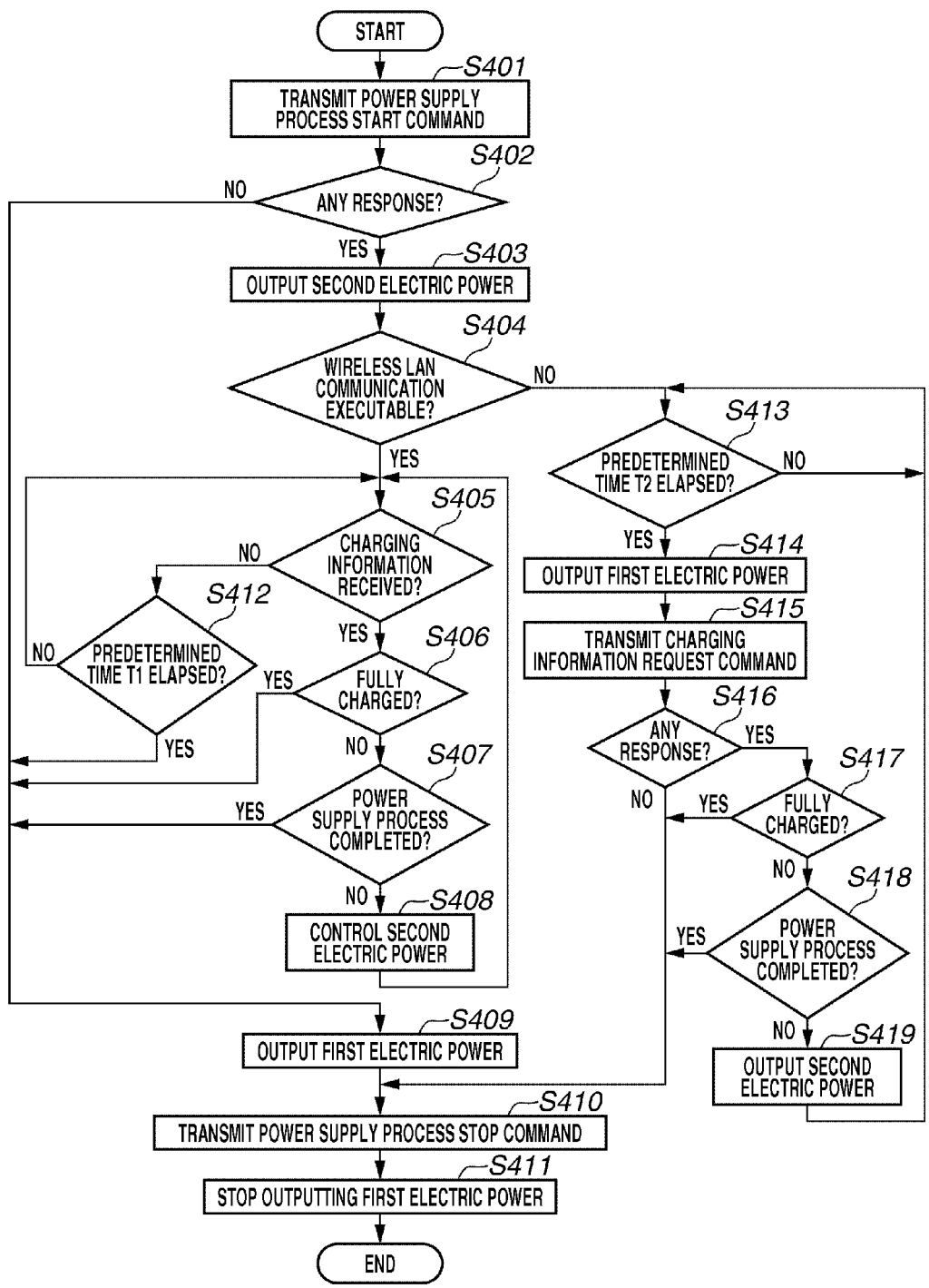
FIG. 4 is a flowchart illustrating an example of power supply control process that can be performed by the power supply apparatus according to the first exemplary embodiment of the present invention.

Next, the power supply control processing to be performed by the power supply apparatus 100 in step S312 in the first exemplary embodiment is described below with reference to a flowchart illustrated in FIG. 4. The power supply control process illustrated in FIG. 4 can be performed by the CPU 105 when the power supply target (i.e., electronic device) is selected by the power supply apparatus 100.

An example of the power supply control process to be performed by the CPU 105 when the electronic device 200 is selected as the power supply target is described below. In this case, it is assumed that the power supply apparatus 100 has already acquired the identification information of the electronic device 200 and the device information of the electronic device 200 from the electronic device 200. Further, in this case, it is assumed that the distance between the power supply apparatus 100 and the electronic device 200 is within the predetermined range. In the present exemplary embodiment, to realize the power supply control process of the flowchart illustrated in FIG. 4, the CPU 105 executes a computer program stored in the ROM 106.

In step S401, the CPU 105 controls the matching circuit 103 and the modulation and demodulation circuit 104 in such a way as to transmit a fourth command to the electronic device 200. The fourth command is a command capable of notifying the electronic apparatus 200 of starting process for supplying the second electric power to the electronic device 200. In this case, the process of the present flowchart proceeds from step S401 to step S402.

In step S402, the CPU 105 determines whether the modulation and demodulation circuit 104 has received a response replying to the fourth command having been transmitted to the electronic device 200 in step S401.

If the CPU 105 determines that the modulation and demodulation circuit 104 has received the response replying to the fourth command (Yes in step S402), the CPU 105 determines that the electronic device 200 has switched its operation mode to receive the second electric power supplied from the power supply apparatus 100. In this case (Yes in step S402), the process of the present flowchart proceeds from step S402 to step S403.

If the CPU 105 determines that the modulation and demodulation circuit 104 has not received the response replying to the fourth command (No in step S402), the CPU 105 determines that the electronic device 200 has not switched the operation mode to receive the second electric power supplied from the power supply apparatus 100. In this case (No in step S402), the process of the present flowchart proceeds from step S402 to step S409.

In step S403, the CPU 105 controls the oscillator 101, the power transmission circuit 102, and the matching circuit 103 in such a way as to supply the second electric power to the electronic device 200 via the power supply antenna 108.

When the CPU 105 supplies the second electric power to the electronic device 200, the CPU 105 can transmit information indicating a value of the second electric power to the electronic device 200 via the power supply antenna 108.

The CPU 105 sets the second electric power with reference to the power receiving information of the electronic device 200 included in the device information acquired when the determination result is Yes in step S306. Further, the CPU 105 sets the second electric power value in such a way as to have a value that is equal to or greater than the electric power required to operate the communication unit 212, with reference to information indicating electric power that the electronic device 200 requires to operate the communication unit 212, which is included in the power receiving information of the electronic device 200. In this case, the process of the present flowchart proceeds from step S403 to step S404.

In step S404, the CPU 105 determines whether the communication unit 112 can start communicating with the communication unit 212 via the wireless LAN. In this case, the CPU 105 controls the communication unit 112 in such a way as to perform wireless LAN communication process to communicate with the communication unit 212 via the wireless LAN with reference to the information required to perform the wireless LAN communication, which has been acquired from the electronic device 200 when the determination result is Yes in step S309.

If the wireless LAN communication process between the communication unit 112 and the communication unit 212 has been completed, the CPU 105 determines that the communication unit 112 can start communicating with the communication unit 212 via the wireless LAN. Further, if it is determined that the electronic device 200 is not adaptable to the wireless LAN with reference to the device information of the electronic device 200 acquired when the determination result is Yes in step S306, the CPU 105 determines that the communication unit 112 cannot start communicating with the communication unit 212 via the wireless LAN.

If the wireless LAN communication process between the communication unit 112 and the communication unit 212 has not been completed, the CPU 105 determines that the communication unit 112 cannot start communicating with the communication unit 212 via the wireless LAN. Further, if the wireless LAN communication process between the communication unit 112 and the communication unit 212 has failed, the CPU 105 determines that the communication unit 112 cannot start communicating with the communication unit 212 via the wireless LAN.

If the CPU 105 determines that the communication unit 112 can start communicating with the communication unit 212 via the wireless LAN (Yes in step S404), the process of the present flowchart proceeds from step S404 to step S405. If the wireless LAN communication process between the communication unit 112 and the communication unit 212 has been completed, the communication unit 112 can transmit commands and data to the communication unit 212 and can receive commands and data from the communication unit 212.

If the CPU 105 determines that the communication unit 112 cannot start communicating with the communication unit 212 via the wireless LAN (No in step S404), the process of the present flowchart proceeds from step S404 to step S413. If the wireless LAN communication process between the communication unit 112 and the communication unit 212 has not been completed, the communication unit 112 cannot transmit any command or data to the communication unit 212 and cannot receive any command or data from the communication unit 212. The CPU 105 controls the timer 109 in such a way as to measure the time elapsed since the above-described determination by the CPU 105 indicating that the communication unit 112 cannot start communicating with the communication unit 212 via the wireless LAN. The time measured by the timer 109 can be stored in the RAM 107.

In step S405, the CPU 105 determines whether the communication unit 112 has received the charging information from the electronic device 200. If the CPU 105 determines that the communication unit 112 has received the charging information from the electronic device 200 (Yes in step S405), the process of the present flowchart proceeds from step S405 to step S406. If the CPU 105 determines that the communication unit 112 has not received the charging information from the electronic device 200 (No in step S405), the process of the present flowchart proceeds from step S405 to step S412.

When the CPU 105 determines that the communication unit 112 has not received the charging information from the electronic device 200, the CPU 105 controls the timer 109 in such a way as to measure the time elapsed since the above-described determination by the CPU 105 indicating that the communication unit 112 has not received the charging information from the electronic device 200. The time measured by the timer 109 can be stored in the RAM 107. In the present exemplary embodiment, the CPU 105 can control the communication unit 112 in such a way as to transmit an instruction that requests the electronic device 200 to transmit the charging information to the electronic device 200, before performing the above-described process in step S405.

In step S406, the CPU 105 determines whether the battery 210 has been fully charged with reference to the charging information acquired when the determination result is Yes in step S405. If the CPU 105 determines that the battery 210 has been fully charged (Yes in step S406), the process of the present flowchart proceeds from step S406 to step S409. If the CPU 105 determines that the battery 210 has not been fully charged (No in step S406), the process of the present flowchart proceeds from step S406 to step S407.

In step S407, the CPU 105 determines whether to stop the process for supplying electric power to the electronic device 200.

For example, the CPU 105 can check if any error has occurred in the power supply apparatus 100 to determine whether to stop the process for supplying electric power to the electronic device 200. In this case, if it is determined that an error has occurred in the power supply apparatus 100, the CPU 105 determines to stop the process for supplying electric power to the electronic device 200 (Yes in step S407).

In this case, if it is determined that no error has occurred in the power supply apparatus 100, the CPU 105 determines to continue the process for supplying electric power to the electronic device 200 (No in step S407). In the present exemplary embodiment, the error includes any error in the communication between the communication unit 112 and the communication unit 212 or can be any error relating to each unit of the power supply apparatus 100.

Further, for example, the CPU 105 can check if the electronic device 200 is connected to the AC power source (not illustrated) to determine whether to stop the process for supplying electric power to the electronic device 200.

If the CPU 105 determines to stop the process for supplying electric power to the electronic device 200 (Yes in step S407), the process of the present flowchart proceeds from step S407 to step S409.

If the CPU 105 determines to continue the process for supplying electric power to the electronic device 200 (No in step S407), the process of the present flowchart proceeds from step S407 to step S408.

In step S408, the CPU 105 controls the second electric power to be supplied to the electronic device 200 based on the charging information acquired when the determination result is Yes in step S405.

For example, the CPU 105 acquires the remaining capacity of the battery 210 from the remaining capacity information included in the charging information acquired when the determination result is Yes in step S405. The CPU 105 sets the value of the second electric power according to the remaining capacity of the battery 210. In this case, if the remaining capacity of the battery 210 is not greater than a predetermined value, the CPU 105 can set the second electric power value to be a greater value, compared to the value in a case where the remaining capacity of the battery 210 is equal to or greater than the predetermined value.

Further, for example, the CPU 105 can determine whether the charging control unit 209 is performing trickle charging for the battery 210 or the charging control unit 209 is performing rapid charging for the battery 210 with reference to the charging information acquired when the determination result is Yes in step S405. Then, the CPU 105 can set the second electric power value based on a determination result. In this case, if the charging control unit 209 is performing rapid charging for the battery 210, the CPU 105 can set the second electric power value to be a greater value, compared to the value in a case where the charging control unit 209 is performing trickle charging for the battery 210.

Further, for example, the CPU 105 determines whether the charging control unit 209 is performing constant-current charging for the battery 210 or performing constant-voltage charging for the battery 210 with reference to the charging information acquired when the determination result is Yes in step S405. Then, the CPU 105 can set the second electric power value based on a determination result. If the second electric power value has been set based on the charging information acquired when the determination result is Yes in step S405, the process of the present flowchart returns from step S408 to step S405.

In step S409, the CPU 105 controls the oscillator 101, the power transmission circuit 102, and the matching circuit 103 in such a way as to supply the first electric power to the electronic device 200. In this case, the process of the present flowchart proceeds from step S409 to step S410.

In step S410, the CPU 105 controls the modulation and demodulation circuit 104 in such a way as to transmit a fifth command to the electronic device 200. The fifth command is a command capable of notifying the electronic apparatus 200 of stopping the process for supplying the second electric power to the electronic device 200. In this case, the process of the present flowchart proceeds from step S410 to step S411.

In step S411, the CPU 105 controls any one of the oscillator 101, the power transmission circuit 102, and the matching circuit 103 in such a way as to stop supplying the first electric power to the electronic device 200, similar to the process performed in step S314. In this case, the CPU 105 terminates the process of the flowchart illustrated in FIG. 4.

In step S412, the CPU 105 determines whether the time measured by the timer 109 when the determination result is No in step S405 has reached a predetermined time T1.

If the CPU 105 determines that the time measured by the timer 109 has reached the predetermined time T1 (Yes in step S412), the process of the present flowchart proceeds from step S412 to step S409. Further, in this case (Yes in step S412), the CPU 105 controls the timer 109 in such a way as to stop measuring the time.

If the CPU 105 determines that the time measured by the timer 109 has not reached the predetermined time T1 (No in step S412), the process of the present flowchart returns from step S412 to step S405.

In step S413, the CPU 105 determines whether the time measured by the timer 109 when the determination result is No in step S404 has reached a predetermined time T2.

If the CPU 105 determines that the time measured by the timer 109 has reached the predetermined time T2 (Yes in step S413), the process of the present flowchart proceeds from step S413 to step S414. Further, in this case (Yes in step S413), the CPU 105 controls the timer 109 in such a way as to stop measuring the time.

If the CPU 105 determines that the time measured by the timer 109 has not reached the predetermined time T2 (No in step S413), the processing of the present flowchart returns from step S413 to step S413.

In step S414, the CPU 105 controls the oscillator 101, the power transmission circuit 102, and the matching circuit 103 in such a way as to supply the first electric power to the electronic device 200. In this case, the process of the present flowchart proceeds from step S414 to step S415.

In step S415, the CPU 105 controls the modulation and demodulation circuit 104 in such a way as to transmit a sixth command to the electronic device 200. The sixth command is a command capable of requesting the electronic device 200 to transmit charging information. In this case, the process of the present flowchart proceeds from step S415 to step S416.

In step S416, the CPU 105 determines whether the modulation and demodulation circuit 104 has received the charging information from the electronic device 200 as a response replying to the sixth command having been transmitted to the electronic device 200 in step S415.

If the CPU 105 determines that the modulation and demodulation circuit 104 has received the charging information from the electronic device 200 (Yes in step S416), the CPU 105 stores the charging information of the electronic device 200 in the RAM 107. In this case (Yes in step S416), the process of the present flowchart proceeds from step S416 to step S417. If the CPU 105 determines that the modulation and demodulation circuit 104 has not received the charging information from the electronic device 200 (No in step S416), the process of the present flowchart proceeds from step S416 to step S410.

In step S417, the CPU 105 determines whether the battery 210 has been fully charged with reference to the charging information acquired when the determination result is Yes in step S416.

If the CPU 105 determines that the battery 210 is in the full-charge state (Yes in step S417), the process of the present flowchart proceeds from step S417 to step S410. If the CPU 105 determines that the battery 210 is not fully charged (No in step S417), the process of the present flowchart proceeds from step S417 to step S418.

In step S418, the CPU 105 determines whether to stop the process for supplying electric power to the electronic device 200, similar to the process performed in step S407.

If the CPU 105 determines to stop the process for supplying electric power to the electronic device 200 (Yes in step S418), the process of the present flowchart proceeds from step S418 to step S410. If the CPU 105 determines to continue the process for supplying electric power to the electronic device 200 (No in step S418), the process of the present flowchart proceeds from step S418 to step S419.

In step S419, the CPU 105 controls the oscillator 101, the power transmission circuit 102, and the matching circuit 103 in such a way as to supply the second electric power to the electronic device 200 via the power supply antenna 108 according to the charging information acquired when the determination result is Yes in step S416.

For example, the CPU 105 acquires the remaining capacity of the battery 210 from the remaining capacity information included in the charging information acquired when the determination result is Yes in step S416. The CPU 105 sets the value of the second electric power according to the remaining capacity of the battery 210. In this case, if the remaining capacity of the battery 210 is not greater than a predetermined value, the CPU 105 can set the second electric power value to be a greater value, compared to the value in a case where the remaining capacity of the battery 210 is equal to or greater than the predetermined value.

Further, for example, the CPU 105 can determine whether the charging control unit 209 is performing trickle charging for the battery 210 or the charging control unit 209 is performing rapid charging for the battery 210 with reference to the charging information acquired when the determination result is Yes in step S416. Then, the CPU 105 can set the second electric power value based on a determination result. In this case, if the charging control unit 209 is performing rapid charging for the battery 210, the CPU 105 can set the second electric power value to be a greater value, compared to the value in a case where the charging control unit 209 is performing trickle charging for the battery 210.

The CPU 105 controls the oscillator 101, the power transmission circuit 102, and the matching circuit 103 in such a way as to supply the second electric power to the electronic device 200 according to the second electric power value having been set. In this case, the process of the present flowchart returns from step S419 to step S413.

Further, in step S419, the CPU 105 controls the timer 109 in such a way as to measure the time elapsed since the output timing of the second electric power. Therefore, if the CPU 105 performs the processing in step S413 again, the CPU 105 determines whether the time measured by the timer 109 in step S419 has reached the predetermined time T2.

In the present exemplary embodiment, in step S408, the CPU 105 controls the second electric power to be supplied to the electronic device 200 based on the charging information acquired when the determination result is Yes in step S405. However, the process in step S408 is not limited to the above-described example. For example, if the CPU 105 acquires operational information and charging information from the electronic device 200 via the communication unit 112, then in step S405, the CPU 105 can control the second electric power to be supplied to the electronic device 200 according to the acquired information (i.e., both the operational information and the charging information).

In the present exemplary embodiment, the operational information is information indicating the operational state of the electronic device 200. The operational information includes information indicating each unit that is currently operating in the electronic device 200 and information indicating electric power required for the electronic device 200. For example, in a state where the imaging unit 213 of the electronic device 200 is operating, the operational information includes information indicating that the imaging unit 213 is currently operating and information indicating electric power required for the imaging unit 213 to operate.

Further, for example, in a state where the charging control unit 209 of the electronic device 200 is charging the battery 210, the operational information includes information indicating that the charging control unit 209 is currently operating, electric power required for the charging control unit 209 to operate, and information indicating electric power required to charge the battery 210.

Further, for example, if the CPU 105 acquires operational information in a state where the charging information is not yet acquired from the electronic device 200 via the communication unit 112, then in step S405, the CPU 105 can control the second electric power to be supplied to the electronic device 200 according to the acquired operational information.

In the present exemplary embodiment, in step S408, the CPU 105 can control the second electric power to be supplied to the electronic device 200 according to the information acquired from the electronic device 200 via the communication unit 112.

Further, the processing in step S419 is not limited to the above-described example in which the CPU 105 sets the numerical value of the second electric power to be supplied to the electronic device 200 according to the charging information acquired when the determination result is Yes in step S416. For example, if the CPU 105 has acquired operational information and charging information from the electronic device 200 via the power supply antenna 108, then in step S419, the CPU 105 can set the value of the second electric power to be supplied to the electronic device 200 based on the acquired information (i.e., both the operational information and the charging information). Further, in step S419, the CPU 105 can set the value of the second electric power based on the information acquired from the electronic device 200 via the power supply antenna 108.

In the present exemplary embodiment, the predetermined time T1 and the predetermined time T2 are arbitrary values, which can be changed by each user or can be stored beforehand in the ROM 106. Further, the predetermined time T1 and the predetermined time T2 are identical to each other or may be different from each other. Further, the CPU 105 can set the predetermined time T1 and the predetermined time T2 according to the second electric power value having been set by the CPU 105.

(Command Reception Process)

An example of command reception process that can be performed by the electronic device 200 according to the first exemplary embodiment is described below with reference to a flowchart illustrated in FIG. 5. To realize the command reception process, the CPU 205 executes a computer program stored in the ROM 206.

Figure 5B:
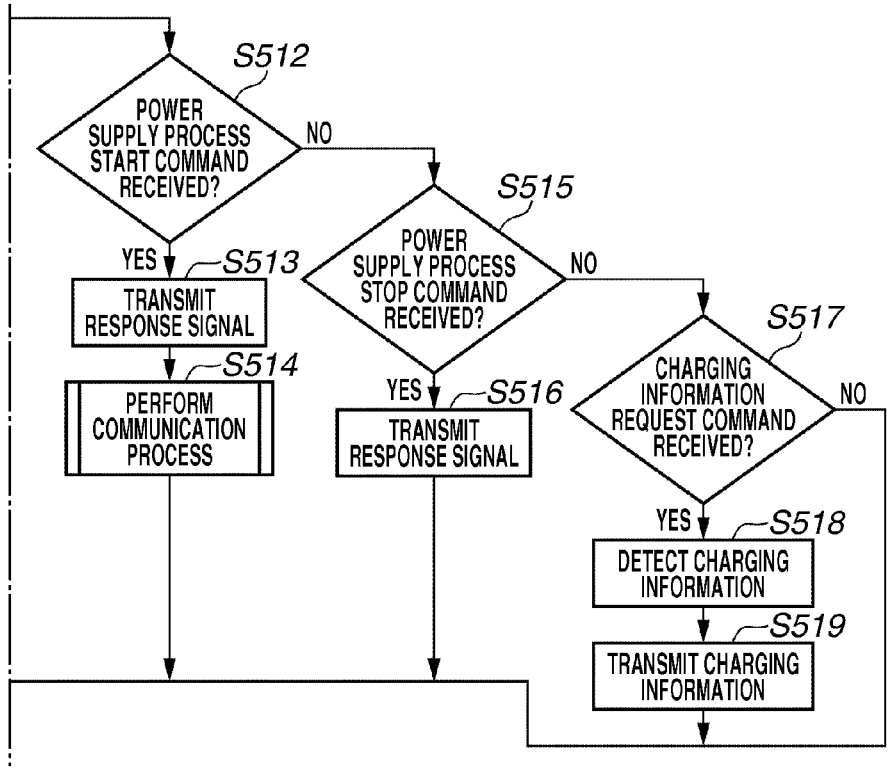
FIG. 5 is a flowchart illustrating an example of command reception process that can be performed by an electronic device according to the first exemplary embodiment of the present invention.

The command reception process illustrated in FIG. 5 can be performed by the electronic device 200. When the CPU 205 performs the command reception process, the power supply apparatus 100 supplies the first electric power (i.e., the power required to perform communications) to the electronic device 200. Further, the CPU 205 can periodically perform the command reception process illustrated in FIG. 5.

In step S501, the CPU 205 sets the first communication mode (as operation mode to be adapted) for the electronic device 200. In this case, the process of the present flowchart proceeds from step S501 to step S502.

In step S502, the CPU 205 determines whether the modulation and demodulation circuit 204 has received a command from the power supply apparatus 100. If the CPU 205 determines that the modulation and demodulation circuit 204 has not received any command from the power supply apparatus 100 (No in step S502), the CPU 205 terminates the process of the flowchart illustrated in FIG. 5. If the CPU 205 determines that the modulation and demodulation circuit 204 has received a command from the power supply apparatus 100 (Yes in step S502), the processing of the present flowchart proceeds from step S502 to step S503.

In step S503, the CPU 205 controls the modulation and demodulation circuit 204 in such a way as to analyze the command received from the power supply apparatus 100. In this case, the process of the present flowchart proceeds from step S503 to step S504. When the modulation and demodulation circuit 204 completes the analysis on the received command, the modulation and demodulation circuit 204 supplies analysis result to the CPU 205.

In step S504, the CPU 205 determines whether any error has been detected from the analysis result supplied from the modulation and demodulation circuit 204. If the CPU 205 determines that an error has been detected from the analysis result supplied from the modulation and demodulation circuit 204 (Yes in step S504), the process of the present flowchart proceeds from step S504 to step S505. If the CPU 205 determines that no error has been detected from the analysis result supplied from the modulation and demodulation circuit 204 (No in step S504), the process of the present flowchart proceeds from step S504 to step S506.

In step S505, the CPU 205 controls the modulation and demodulation circuit 204 in such a way as to perform load modulation to transmit error information indicating the occurrence of an error, as a response replying to the command transmitted from the power supply apparatus 100, to the power supply apparatus 100. In this case, the CPU 205 terminates the processing of the flowchart illustrated in FIG. 5. Subsequently, the CPU 205 performs error process to fix the detected error.

In step S506, the CPU 205 determines whether the modulation and demodulation circuit 204 has received the first command from the analysis result supplied from the modulation and demodulation circuit 204. If the CPU 205 determines that the command received by the modulation and demodulation circuit 204 is not the first command (No in step S506), the process of the present flowchart proceeds from step S506 to step S508. If the CPU 205 determines that the command received by the modulation and demodulation circuit 204 is the first command (Yes in step S506), the process of the present flowchart proceeds from step S506 to step S507.

In step S507, the CPU 205 controls the modulation and demodulation circuit 204 in such a way as to perform load modulation to transmit identification information (ID) stored in the ROM 206, as a response replying to the first command, to the power supply apparatus 100. In this case, the CPU 205 terminates the process of the flowchart illustrated in FIG. 5.

In step S508, the CPU 205 determines whether the modulation and demodulation circuit 204 has received the second command from the analysis result supplied from the modulation and demodulation circuit 204. If the CPU 205 determines that the command received by the modulation and demodulation circuit 204 is not the second command (No in step S508), the process of the present flowchart proceeds from step S508 to step S510. If the CPU 205 determines that the command received by the modulation and demodulation circuit 204 is the second command (Yes in step S508), the process of the present flowchart proceeds from step S508 to step S509.

In step S509, the CPU 205 controls the matching circuit 202 and the modulation and demodulation circuit 204 in such a way as to perform load modulation to transmit device information, as a response replying to the second command, to the power supply apparatus 100. In the present exemplary embodiment, the CPU 205 can read the device information from the ROM 206. In this case, the CPU 205 terminates the process of the flowchart illustrated in FIG. 5.

In step S510, the CPU 205 determines whether the modulation and demodulation circuit 204 has received the third command from the analysis result supplied from the modulation and demodulation circuit 204. If the CPU 205 determines that the command received by the modulation and demodulation circuit 204 is not the third command (No in step S510), the process of the present flowchart proceeds from step S510 to step S512. If the CPU 205 determines that the command received by the modulation and demodulation circuit 204 is the third command (Yes in step S510), the process of the present flowchart proceeds from step S510 to step S511.

In step S511, the CPU 205 controls the matching circuit 202 and the modulation and demodulation circuit 204 in such a way as to perform load modulation to transmit SSID and MAC address information stored in the ROM 206, as a response replying to the third command, to the power supply apparatus 100. In this case, the CPU 205 terminates the process of the flowchart illustrated in FIG. 5.

In step S512, the CPU 205 determines whether the modulation and demodulation circuit 204 has received the fourth command from the analysis result supplied from the modulation and demodulation circuit 204. If the CPU 205 determines that the command received by the modulation and demodulation circuit 204 is not the fourth command (No in step S512), the process of the present flowchart proceeds from step S512 to step S515. If the CPU 205 determines that the command received by the modulation and demodulation circuit 204 is the fourth command (Yes in step S512), the process of the present flowchart proceeds from step S512 to step S513.

In step S513, the CPU 205 changes the operation mode of the electronic device 200 to the charging mode.

When the electronic device 200 is operating in the charging mode, the electric power received from the power supply apparatus 100 can be supplied to the CPU 205, the timer 211, the matching circuit 202, the modulation and demodulation circuit 204, the rectifying and smoothing circuit 203, the current and voltage detection unit 214, the ROM 206, the RAM 207, and the regulator 208. Further, when the electronic device 200 is operating in the charging mode, the CPU 205 turns on the switching unit 215 to connect the regulator 208 to the charging control unit 209. The electric power of the power supply apparatus 100 is supplied to the charging control unit 209 and the battery 210 via the switching unit 215.

In this case, the CPU 205 supplies the electric power received from the power supply apparatus 100 to the charging control unit 209 and the battery 210 via the switching unit 215 and causes the charging control unit 209 to charge the battery 210.

When the operation mode of the electronic device 200 is switched to the charging mode, the CPU 205 controls the matching circuit 202 and the modulation and demodulation circuit 204 in such a way as to perform load modulation to transmit a response signal replying to the fourth command to the power supply apparatus 100. In this case, the process of the present flowchart proceeds from step S513 to step S514.

In step S514, the CPU 205 performs communication process, which is described in detail below. If the communication process has been completed, the CPU 205 terminates the process of the flowchart illustrated in FIG. 5.

In step S515, the CPU 205 determines whether the modulation and demodulation circuit 204 has received the fifth command from the analysis result supplied from the modulation and demodulation circuit 204. If the CPU 205 determines that the command received by the modulation and demodulation circuit 204 is not the fifth command (No in step S515), the process of the present flowchart proceeds from step S515 to step S517. If the CPU 205 determines that the command received by the modulation and demodulation circuit 204 is the fourth command (Yes in step S515), the process of the present flowchart proceeds from step S515 to step S516.

In step S516, the CPU 205 deselects the charging mode. If the operation mode of the electronic device 200 is switched from the charging mode to other mode, the battery 210 supplies electric power to the CPU 205, the timer 211, the matching circuit 202, the modulation and demodulation circuit 204, the rectifying and smoothing circuit 203, the current and voltage detection unit 214, the ROM 206, the RAM 207, and the regulator 208.

When the operation mode of the electronic device 200 is switched from the charging mode, the CPU 205 controls the matching circuit 202 and the modulation and demodulation circuit 204 in such a way as to perform load modulation to transmit a response signal replying to the fifth command to the power supply apparatus 100. In this case, the CPU 205 terminates the process of the flowchart illustrated in FIG. 5.

In step S517, the CPU 205 determines whether the modulation and demodulation circuit 204 has received the sixth command from he analysis result supplied from the modulation and demodulation circuit 204. If the CPU 205 determines that the command received by the modulation and demodulation circuit 204 is not the sixth command (No in step S517), the CPU 205 terminates the process of the flowchart illustrated in FIG. 5. If the CPU 205 determines that the command received by the modulation and demodulation circuit 204 is the sixth command (Yes in step S517), the process of the present flowchart proceeds from step S517 to step S518.

In step S518, the CPU 205 controls the charging control unit 209 in such a way as to detect the charging information of the electronic device 200. The CPU 205 stores the charging information of the electronic device 200 detected by the charging control unit 209 in the RAM 207. In this case, the process of the present flowchart proceeds from step S518 to step S519.

In step S519, the CPU 205 controls the modulation and demodulation circuit 204 in such a way as to perform load modulation to transmit the charging information of the electronic device 200, as a response replying to the sixth command, to the power supply apparatus 100. In this case, the CPU 205 terminates the process of the flowchart illustrated in FIG. 5.

The communication process according to the first exemplary embodiment (i.e., the process to be performed by the electronic device 200 in step S514) is described below with reference to a flowchart illustrated in FIG. 6. In the present exemplary embodiment, it is assumed that the battery 210 can be charged by the charging control unit 209 when the CPU 205 is performing the communication process illustrated in FIG. 6. However, if the battery 210 is fully charged while the CPU 205 is performing the communication process illustrated in FIG. 6, the charging control unit 209 stops charging the battery 210.

Further, if the modulation and demodulation circuit 204 receives the fifth command in a state where the CPU 205 is performing the communication process illustrated in FIG. 6, the charging control unit 209 stops charging the battery 210. If an error has occurred in the electronic device 200 while the CPU 205 is performing the communication process illustrated in FIG. 6, the charging control unit 209 stops charging the battery 210.

In step S601, the CPU 205 compares the electric power transmitted from the power supply apparatus 100 to the electronic device 200 with a predetermined value B. Further, the CPU 205 determines whether the electric power transmitted from the power supply apparatus 100 to the electronic device 200 is equal to or greater than the predetermined value B.

The CPU 205 can calculate the electric power transmitted from the power supply apparatus 100 to the electronic device 200 based on the current information and the voltage information supplied from the current and voltage detection unit 214.

The predetermined value B is a value indicating the electric power required to operate the communication unit 212. For example, the predetermined value B is within a range of 3 W to 5 W. Further, the predetermined value B is stored beforehand in the ROM 206.

If the CPU 205 determines that the electric power transmitted from the power supply apparatus 100 to the electronic device 200 is equal to or greater than the predetermined value B (Yes in step S601), the process of the present flowchart proceeds from step S601 to step S602. If the CPU 205 determines that the electric power transmitted from the power supply apparatus 100 to the electronic device 200 is not equal to or not greater than the predetermined value B (No in step S601), the process of the present flowchart proceeds from step S601 to step S615.

In step S602, the CPU 205 sets the second communication mode (as operation mode to be adapted) for the electronic device 200. Further, the CPU 205 turns on the switching unit 216 to connect the communication unit 212 to the regulator 208. When the switching unit 216 is turned on, the electric power transmitted from the power supply apparatus 100 to the electronic device 200 can be supplied to the communication unit 212 via the regulator 208. In this case, the communication unit 212 starts authentication process adaptable to the wireless LAN in such a way as to communicate with the communication unit 112 via the wireless LAN. In this case, the process of the present flowchart proceeds from step S602 to step S603.

In step S603, the CPU 205 determines whether the communication unit 212 can start wireless communication. If the CPU 205 determines that the authentication process adaptable to the wireless LAN is not yet completed between the communication unit 112 and the communication unit 212, the CPU 205 determines that the communication unit 212 cannot start the wireless communication (No in step S603). In this case (No in step S603), the process of the present flowchart proceeds from step S603 to step S615.

If the CPU 205 determines that the authentication process adaptable to the wireless LAN is already accomplished between the communication unit 112 and the communication unit 212, the CPU 205 determines that the communication unit 212 can start the wireless communication (Yes in step S603). In this case (Yes in step S603), the process of the present flowchart proceeds from step S603 to step S604.

In step S604, the CPU 205 determines whether there is any non-transmitted data recorded on the recording medium 217a. In the present exemplary embodiment, the non-transmitted data include video data and audio data that are not yet transmitted from the electronic device 200 to the power supply apparatus 100.

If the CPU 205 determines that there is not any non-transmitted data recorded on the recording medium 217a, the CPU 205 determines that the video data and the audio data recorded on the recording medium 217a have been entirely transmitted to the power supply apparatus 100. When the CPU 205 determines that there is not any non-transmitted data recorded on the recording medium 217a (No in step S604), the process of the present flowchart proceeds from step S604 to step S605.

If the CPU 205 determines that there is non-transmitted data recorded on the recording medium 217a (Yes in step S604), the CPU 205 determines that the video data and the audio data recorded on the recording medium 217a are not entirely transmitted to the power supply apparatus 100. If the CPU 205 determines that there is non-transmitted data recorded on the recording medium 217a (Yes in step S604), the process of the present flowchart proceeds from step S604 to step S610.

In step S605, the CPU 205 determines whether a transmission instruction has been input to the CPU 205. The transmission instruction is an instruction that requests the CPU 205 to transmit specific data recorded on the recording medium 217a to the power supply apparatus 100. For example, the transmission instruction can be input to the CPU 205 by a user via the operation unit 218 of the electronic device 200. Further, the transmission instruction can be transmitted from the power supply apparatus 100 to the electronic device 200.

If the CPU 205 determines that the transmission instruction has been input to the CPU 205 (Yes in step S605), the process of the present flowchart proceeds from step S605 to step S610. If the CPU 205 determines that the transmission instruction has not been input to the CPU 205 (No in step S605), the process of the present flowchart proceeds from step S605 to step S606.

In step S606, the CPU 205 acquires charging information from the charging control unit 209. In this case, the process of the present flowchart proceeds from step S606 to step S607.

In step S607, the CPU 205 controls the communication unit 212 in such a way as to transmit the charging information acquired from the charging control unit 209 in step S606 to the power supply apparatus 100. If the communication unit 212 has completely transmitted the charging information to the power supply apparatus 100, the process of the present flowchart proceeds from step S607 to step S608.

The CPU 205 controls the timer 211 in such a way as to measure the time elapsed since the transmission timing of the charging information from the communication unit 212 to the power supply apparatus 100 in step S607.

In step S608, the CPU 205 determines whether the electric power transmitted from the power supply apparatus 100 to the electronic device 200 is equal to or greater than the predetermined value B, similar to the process performed in step S601.

If the CPU 205 determines that the electric power transmitted from the power supply apparatus 100 to the electronic device 200 is equal to or greater than the predetermined value B (Yes in step S608), the process of the present flowchart proceeds from step S608 to step S609. If the CPU 205 determines that the electric power transmitted from the power supply apparatus 100 to the electronic device 200 is not greater than the predetermined value B (No in step S608), the process of the present flowchart proceeds from step S608 to step S615.

In step S609, the CPU 205 determines whether the time measured by the timer 211 in step S607 has reached a predetermined time T3.

If the CPU 205 determines that the time measured by the timer 211 has reached the predetermined time T3 (Yes in step S609), the processing of the present flowchart returns from step S609 to step S604. Further, in this case (Yes in step S609), the CPU 205 controls the timer 211 in such a way as to stop measuring the time. If the CPU 205 determines that the time measured by the timer 211 has not reached the predetermined time T3 (No in step S609), the process of the present flowchart returns from step S609 to step S609.

In step S610, the CPU 205 acquires charging information from the charging control unit 209, similar to the process performed in step S606. In this case, the process of the present flowchart proceeds from step S610 to step S611.

In step S611, the CPU 205 controls the communication unit 212 in such a way as to transmit the charging information acquired from the charging control unit 209 in step S610 to the power supply apparatus 100. In this case, the process of the present flowchart proceeds from step S611 to step S612. The CPU 205 controls the timer 211 in such a way as to measure the time elapsed since the transmission timing of the charging information from the communication unit 212 to the power supply apparatus 100 in step S611.

In step S612, the CPU 205 controls the communication unit 212 in such a way as to transmit predetermined data recorded on the recording medium 217 to the power supply apparatus 100.

In the case where the CPU 205 determines that there is non-transmitted data recorded on the recording medium 217a (Yes in step S604), the predetermined data is the non-transmitted data recorded on the recording medium 217a.

Further, in the case where the CPU 205 determines that the transmission instruction has been input to the CPU 205 (Yes in step S605), in step S616, the predetermined data is the specific data indicated by the transmission instruction.

When the transmission of the predetermined data to the power supply apparatus 100 by the communication unit 212 has been completed, the process of the present flowchart proceeds from step S612 to step S613.

In step S613, the CPU 205 determines whether the electric power transmitted from the power supply apparatus 100 to the electronic device 200 is equal to or greater than the predetermined value B, similar to the process performed in step S601.

If the CPU 205 determines that the electric power transmitted from the power supply apparatus 100 to the electronic device 200 is equal to or greater than the predetermined value B (Yes in step S613), the process of the present flowchart proceeds from step S613 to step S614. If the CPU 205 determines that the electric power transmitted from the power supply apparatus 100 to the electronic device 200 is not greater than the predetermined value B (No in step S613), the process of the present flowchart proceeds from step S613 to step S615.

In step S614, the CPU 205 determines whether the time measured by the timer 211 in step S611 has reached a predetermined time T4.

If the CPU 205 determines that the time measured by the timer 211 has reached the predetermined time T4 (Yes in step S614), the process of the present flowchart returns from step S614 to step S604. Further, in this case (Yes in step S614), the CPU 205 controls the timer 211 in such a way as to stop measuring the time.

If the CPU 205 determines that the time measured by the timer 211 has not reached the predetermined time T4 (No in step S614), the process of the present flowchart returns from step S614 to step S612.

In step S615, the CPU 205 controls the communication unit 212 in such a way as to stop communicating via the wireless LAN. The CPU 205 controls the communication unit 212 in such a way as to stop operating. For example, the CPU 205 turns off the switching unit 216 to disconnect the communication unit 212 from the regulator 208. Further, for example, the CPU 205 can bring the communication unit 212 into a standby state instead of disconnecting the communication unit 212 from the communication unit 112.

After the communication via the wireless LAN is stopped by the CPU 205, the process of the present flowchart proceeds from step S615 to step S616.

In step S616, the CPU 205 sets the first communication mode (as operation mode to be adapted) for the electronic device 200. In this case, the CPU 205 terminates the process of the flowchart illustrated in FIG. 6. If the process in step S616 has been completed, the CPU 205 resumes the command reception process illustrated in FIG. 5.

Thus, when the electronic device 200 has received the sixth command from the power supply apparatus 100 via the power receiving antenna 201, the electronic device 200 can transmit the charging information, as a response replying to the sixth command, to the power supply apparatus 100 via the power receiving antenna 201.

In the present exemplary embodiment, the process in step S607 is not limited to the above-described example in which the CPU 205 causes the communication unit 212 to transmit the charging information detected in step S606 to the power supply apparatus 100.

For example, in step S607, the CPU 205 can control the communication unit 212 in such a way as to transmit the charging information detected in step S606 to the power supply apparatus 100 if the communication unit 212 receives an instruction requesting the charging information from the power supply apparatus 100.

Further, for example, in step S607, the CPU 205 can control the communication unit 212 in such a way as to transmit operational information of the electronic device 200, in addition to the charging information, to the power supply apparatus 100. In this case, the CPU 205 identifies each unit that receives electric power from the regulator 208 to detect an operation to be performed by the electronic device 200 and the electric power required for the electronic device 200 to perform the operation.

Thus, the CPU 205 detects the operational information of the electronic device 200. Further, for example, in step S607, the CPU 205 can control the communication unit 212 to transmit the operational information of the electronic device 200 to the power supply apparatus 100, instead of transmitting the charging information.

In the present exemplary embodiment, the process in step S611 is not limited to the above-described example in which the CPU 205 causes the communication unit 212 to transmit the charging information detected in step S610 to the power supply apparatus 100.

For example, in step S611, the CPU 205 can control the communication unit 212 in such a way as to transmit the charging information detected in step S610 to the power supply apparatus 100 if the communication unit 212 receives an instruction requesting the charging information from the power supply apparatus 100.

Further, for example, in step S611, the CPU 205 can control the communication unit 212 in such a way as to transmit the operational information of the electronic device 200, in addition to the charging information, to the power supply apparatus 100. Further, for example, in step S611, the CPU 205 can control the communication unit 212 in such a way as to transmit the operational information of the electronic device 200 to the power supply apparatus 100, instead of transmitting the charging information. Further, if an error relating to the charging is detected in the communication process illustrated in FIG. 6, the CPU 205 can control the communication unit 212 in such a way as to transmit error information indicating the occurrence of a charging error to the power supply apparatus 100.

In the present exemplary embodiment, the predetermined time T3 and the predetermined time T4 are arbitrary values, which can be changed by each user or can be stored beforehand in the ROM 206. Further, the predetermined time T3 and the predetermined time T4 are identical to each other or may be different from each other. Further, the CPU 205 can set the predetermined time T3 and the predetermined time T4 according to the electric power transmitted from the power supply apparatus 100 to the electronic device 200.

As described above, if the communication unit 212 is operable while electric power is supplied from the power supply apparatus 100, the electronic device 200 according to the first exemplary embodiment causes the communication unit 212 to send notification information relating to the charging of the electronic device 200 to the power supply apparatus 100.

Thus, even in a state where the power supply apparatus 100 supplies the second electric power to the electronic device 200, the power supply apparatus 100 can control the electric power to be supplied to the electronic device 200 according to the information transmitted from the communication unit 212 of the electronic device 200.

Further, the electronic device 200 can transmit non-transmitted data or selected data to the power supply apparatus 100 and further can transmit charging related information to the power supply apparatus 100. Therefore, even when the power supply apparatus 100 supplies the second electric power to the electronic device 200, the power supply apparatus 100 can control the electric power supplied to the electronic device 200 according to the charging related information received from the communication unit 212 of the electronic device 200 while receiving data from the electronic device 200.

Accordingly, even when the power supply apparatus 100 is supplying electric power required to charge the battery 210 via the power supply antenna 201 to the electronic device 200, the power supply apparatus 100 can appropriately control the electric power to be supplied to the electronic device 200 with reference to the information received from the electronic device 200 via the communication unit 112.

In the first exemplary embodiment, the communication unit 112 and the communication unit 212 are not limited to the above-described examples that are adaptable to the wireless LAN. The power supply system according to the first exemplary embodiment can replace the process or configuration relating to the wireless LAN communication by any other process or configuration adaptable to a communication method other than the wireless LAN if the common communication method is applied to the communication unit 112 and the communication unit 212.

For example, the power supply apparatus 100 according to the first exemplary embodiment may include a communication unit that is adaptable to Bluetooth®. The electronic device 200 according to the first exemplary embodiment may include a communication unit that is adaptable to Bluetooth.

Further, for example, the communication unit 112 of the power supply apparatus 100 according to the first exemplary embodiment can perform communications via a serial bus interface, such as Universal Serial Bus (USB). In this case, the communication unit 212 of the electronic device 200 according to the first exemplary embodiment can perform communications via a serial bus interface (e.g. a USB).

Further, for example, the communication unit 112 of the power supply apparatus 100 according to the first exemplary embodiment can perform communications via a High-Definition Multimedia Interface (HDMI®) or the like. In this case, the communication unit 212 of the electronic device 200 according to the first exemplary embodiment can perform communications via an HDMI interface.

In the first exemplary embodiment, the electronic device 200 performs the communication process illustrated in FIG. 6 while the electronic device 200 charges the battery 210. However, the electronic device 200 can perform the communication process illustrated in FIG. 6 even when the electronic device 200 is not charging the battery 210. In this case, the electronic device 200 transmits the operational information to the power supply apparatus 100, instead of transmitting the charging information.

A power supply system according to a second exemplary embodiment includes various units similar to those described in the first exemplary embodiment and therefore the descriptions thereof are not repeated. The power supply system according to the second exemplary embodiment has the following features that are different from those described in the first exemplary embodiment.

More specifically, in the first exemplary embodiment, the electronic device 200 causes the communication unit 212 to transmit the charging information to the power supply apparatus 100 when the electric power received by the electronic device 200 is equal to or greater than the predetermined value B. However, in the second exemplary embodiment, if the electric power received by the electronic device 200 is equal to or greater than a predetermined value C, the electronic device 200 transmits the charging information to the power supply apparatus 100 via the power receiving antenna 201 even in a case where a command that requests the charging information has not been received from the power supply apparatus 100.

The electronic device 200 according to the second exemplary embodiment includes a third communication mode, as one of the operation modes for the electronic device 200, in addition to the first communication mode and the second communication mode.

The third communication mode is a mode enabling the electronic device 200 to communicate with the power supply apparatus 100 unidirectionally via the power receiving antenna 201. When the electronic device 200 is operating in the third communication mode, the electronic device 200 can transmit a command or predetermined information to the power supply apparatus 100 via the power receiving antenna 201.

When the electronic device 200 is operating in the third communication mode, the electronic device 200 does not receive any command or information from the power supply apparatus 100 via the power receiving antenna 201. When the operation mode of the electronic device 200 is the third communication mode, the electronic device 200 can transmit predetermined information or command to the power supply apparatus 100 via the power receiving antenna 201.

The power supply apparatus 100 according to the second exemplary embodiment performs authentication process that is similar to the process described in the first exemplary embodiment with reference to FIG. 3.

Figure 7:
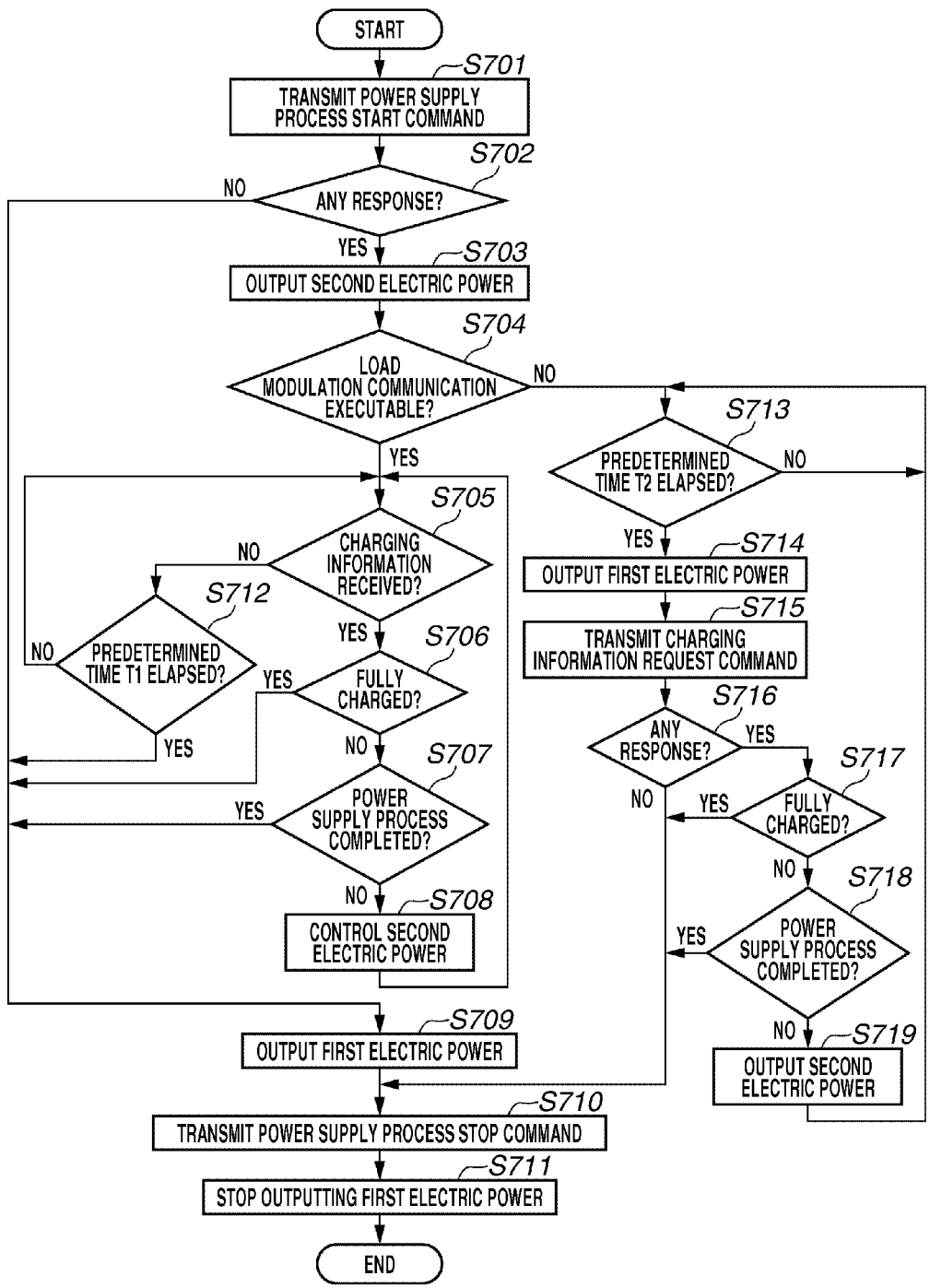
FIG. 7 is a flowchart illustrating an example of the power supply control process that can be performed by the power supply apparatus according to a second exemplary embodiment of the present invention.

An example of the power supply control process that can be performed by the power supply apparatus 100 according to the second exemplary embodiment is described in detail below with reference to FIG. 7. The power supply control process illustrated in FIG. 7 is similar to the above-described process described in the first exemplary embodiment and therefore the description thereof is not repeated except for the following characteristic features.

Processing to be performed in step S701 to step S703 is similar to the process performed in step S401 to step S403 and therefore the description thereof is not repeated. Process to be performed in step S707 is similar to the process performed in step S407 and therefore the description thereof is not repeated. Process to be performed in step S709 to step S719 is similar to the process performed in step S409 to step S419 and therefore the description thereof is not repeated.

When the output of the second electric power in step S703 has been completed, the process of the present flowchart proceeds from step S703 to step S704.

In step S704, the CPU 105 determines whether the electronic device 200 can communicate with the power supply apparatus 100 via the power receiving antenna 201 by using load modulation. For example, the CPU 105 can refer to the communication ability information included in the device information acquired from the electronic device 200 in determining whether the electronic device 200 can communicate with the power supply apparatus 100 via the power receiving antenna 201 by using load modulation.

Further, for example, in a state where the second electric power is supplied to the electronic device 200 in step S703, the CPU 105 can determine whether a command or predetermined information has been received from the electronic device 200 via the power supply antenna 108, to perform the process in step S704.

In this case, if it is determined that a command or predetermined information has been received from the electronic device 200 via the power supply antenna 108, the CPU 105 determines that the electronic device 200 can communicate with the power supply apparatus 100 via the power receiving antenna 201 by using load modulation. Further, if it is determined that there is not any command or predetermined information having been received from the electronic device 200 via the power supply antenna 108, the CPU 105 determines that the electronic device 200 cannot communicate with the power supply apparatus 100 via the power receiving antenna 201 by using load modulation.

If the CPU 105 determines that the electronic device 200 can communicate with the power supply apparatus 100 via the power receiving antenna 201 based on load modulation (Yes in step S704), the process of the present flowchart proceeds from step S704 to step S705.

If it is determined that the electronic device 200 cannot communicate with the power supply apparatus 100 via the power receiving antenna 201 based on load modulation (No in step S704), the process of the present flowchart proceeds from step S704 to step S713. In this case, the CPU 105 controls the timer 109 in such a way as to measure the time elapsed since the above-described determination by the electronic device 200 indicating that any command or predetermined information cannot be transmitted to the power supply apparatus 100 via the power receiving antenna 201 by using load modulation.

In step S705, the CPU 105 determines whether the modulation and demodulation circuit 104 has received the charging information.

If the CPU 105 determines that the modulation and demodulation circuit 104 has received the charging information (Yes in step S705), the process of the present flowchart proceeds from step S705 to step S706. If the CPU 105 determines that the modulation and demodulation circuit 104 has not received the charging information (No in step S705), the process of the present flowchart proceeds from step S705 to step S712.

When the CPU 105 determines that the communication unit 112 has not received the charging information from the electronic device 200, the CPU 105 controls the timer 109 in such a way as to measure the time elapsed since the above-described determination indicating that the modulation and demodulation circuit 104 has not received the charging information. The time measured by the timer 109 can be stored in the RAM 107.

In step S706, the CPU 105 determines whether the battery 210 has been fully charged based on the charging information acquired when the determination result is Yes in step S705. If the CPU 105 determines that the battery 210 is in the full-charge state (Yes in step S706), the process of the present flowchart proceeds from step S706 to step S709. If the CPU 105 determines that the battery 210 is not fully charged (No in step S706), the process of the present flowchart proceeds from step S706 to step S707.

If the CPU 105 determines to continue the process for supplying electric power to the electronic device 200 (No in step S707), the process of the present flowchart proceeds from step S707 to step S708.

In step S708, the CPU 105 controls the second electric power supplied to the electronic device 200 based on the charging information acquired when the determination result is Yes in step S705. If the setting of the second electric power based on the charging information has been completed, the process of the present flowchart returns from step S708 to step S705.

The electronic device 200 according to the second exemplary embodiment performs command reception process similar to that described with reference to FIG. 5 in the first exemplary embodiment. Next, the communication process to be executed in step S514 by the electronic device 200 according to the second exemplary embodiment is described below with reference to a flowchart illustrated in FIG. 8.

Communication Process

An example of the communication process (i.e., the process to be performed in step S514), which can be performed by the electronic device 200, according to the second exemplary embodiment is described in detail below with reference to the flowchart illustrated in FIG. 8.

In step S801, the CPU 205 compares the electric power transmitted from the power supply apparatus 100 to the electronic device 200 with the predetermined value C. Further, the CPU 205 determines whether the electric power transmitted from the power supply apparatus 100 to the electronic device 200 is equal to or greater than the predetermined value C. The electric power transmitted from the power supply apparatus 100 to the electronic device 200 is an electric power that can be calculated by the CPU 205 based on the current information and the voltage information supplied from the current and voltage detection unit 214.

The predetermined value C is a value indicating a minimum value of the second electric power that can be supplied from the power supply apparatus 100 to the electronic device 200. For example, the predetermined value C is 2 W when the second electric power takes a value in the range from 2 W to 10 W.

The predetermined value C can be any other value usable to determine whether the power supply apparatus 100 is supplying the first electric power (i.e., the electric power required to transmit a command to the electronic device 200) to the electronic device 200 or determine whether the power supply apparatus 100 is supplying the second electric power to the electronic device 200. Further, the predetermined value C can be a value detected from the information transmitted from the power supply apparatus 100 to the electronic device 200 or can be a value stored beforehand in the ROM 206.

If the CPU 205 determines that the electric power transmitted from the power supply apparatus 100 to the electronic device 200 is equal to or greater than the predetermined value C (Yes in step S801), the CPU 205 determines that the power supply apparatus 100 is currently supplying the second electric power to the electronic device 200. In this case (Yes in step S801), the power supply apparatus 100 cannot acquire the charging information from the electronic device 200 by transmitting the sixth command to the electronic device 200.

Therefore, if the CPU 205 determines that the electric power transmitted from the power supply apparatus 100 to the electronic device 200 is equal to or greater than the predetermined value C (Yes in step S801), the process of the present flowchart proceeds from step S801 to step S802. If the CPU 205 determines that the electric power transmitted from the power supply apparatus 100 to the electronic device 200 is not greater than the predetermined value C (No in step S801), the CPU 205 determines that the power supply apparatus 100 is currently supplying the first electric power to the electronic device 200.

In this case (No in step S801), the power supply apparatus 100 can acquire the charging information from the electronic device 200 by transmitting the sixth command to the electronic device 200. Therefore, if the CPU 205 determines that the electric power transmitted from the power supply apparatus 100 to the electronic device 200 is not greater than the predetermined value C (No in step S801), the process of the present flowchart proceeds from step S801 to step S808.

In step S802, the CPU 205 sets the third communication mode (as operation mode to be adapted) for the electronic device 200. In this case, the process of the present flowchart proceeds from step S802 to step S803.

In step S803, the CPU 205 determines whether the modulation and demodulation circuit 204 can communicate with the power supply apparatus 100 based on load modulation by changing a load included in the modulation and demodulation circuit 204.

For example, the CPU 205 controls the modulation and demodulation circuit 204 in such a way as to transmit a command indicating that the electronic device 200 performs communications by using load modulation to the power supply apparatus 100 via the power receiving antenna 201. Further, the CPU 205 determines whether the modulation and demodulation circuit 204 can communicate with the power supply apparatus 100 through load modulation when a response is returned from the power supply apparatus 100 in response to the command transmitted to the power supply apparatus 100 via the power receiving antenna 201.

If the CPU 205 confirms that the modulation and demodulation circuit 204 has normally received the response from the power supply apparatus 100, the CPU 205 can determine that the power supply apparatus 100 has normally received the command transmitted from the electronic device 200 to the power supply apparatus 100 via the power receiving antenna 201. In this case, the CPU 205 determines that the modulation and demodulation circuit 204 can communicate with the power supply apparatus 100 by using load modulation.

If the CPU 205 confirms that the modulation and demodulation circuit 204 has not received any response from the power supply apparatus 100, the CPU 205 determines that the power supply apparatus 100 has not received the command transmitted from the electronic device 200 to the power supply apparatus 100 via the power receiving antenna 201. In this case, the CPU 205 determines that the modulation and demodulation circuit 204 cannot communicate with the power supply apparatus 100 by using load modulation.

If the power supply apparatus 100 receives a command from the electronic device 200 via the power supply antenna 201, the power supply apparatus 100 supplies the first electric power to the electronic device 200 and transmits a response replying to the command received from the electronic device 200 to the electronic device 200 via the power supply antenna 108. When the response replying to the command received from the electronic device 200 has been transmitted from the power supply apparatus 100 to the electronic device 200, the power supply apparatus 100 supplies the second electric power again to the electronic device 200.

If the CPU 205 determines that the modulation and demodulation circuit 204 can communicate with the power supply apparatus 100 by using load modulation (Yes in step S803), the process of the present flowchart proceeds from step S803 to step S804.

If the CPU 205 determines that the modulation and demodulation circuit 204 cannot communicate with the power supply apparatus 100 by using load modulation (No in step S803), the process of the present flowchart proceeds from step S803 to step S808.

In step S804, the CPU 205 detects the charging information from the charging control unit 209. In this case, the process of the present flowchart proceeds from step S804 to step S805.

In step S805, the CPU 205 controls the modulation and demodulation circuit 204 in such a way as to transmit the charging information detected in step S804 to the power supply apparatus 100.

In this case, the modulation and demodulation circuit 204 converts the charging information into a bit data (consisting of 1 and 0) by changing the internal load of the modulation and demodulation circuit 204 and transmits the obtained bit data to the power supply apparatus 100. If the internal load of the modulation and demodulation circuit 204 varies, the current flowing to the power supply antenna 108 of the power supply apparatus 100 changes correspondingly. Therefore, the power supply apparatus 100 can receive the charging information from the electronic device 200 in response to a change in the current flowing to the power supply antenna 108.

When the transmission of the charging information from the modulation and demodulation circuit 204 to the power supply apparatus 100 has been completed, the process of the present flowchart proceeds from step S805 to step S806.

The CPU 205 controls the timer to measure the time elapsed since the completed transmission of the charging information from the modulation and demodulation circuit 204 to the power supply apparatus 100.

In step S806, the CPU 205 determines whether the electric power transmitted from the power supply apparatus 100 to the electronic device 200 is equal to or greater than the predetermined value C, similar to the process performed in step S801.

If the CPU 205 determines that the electric power transmitted from the power supply apparatus 100 to the electronic device 200 is equal to or greater than the predetermined value C (Yes in step S806), the process of the present flowchart proceeds from step S806 to step S807. If the CPU 205 determines that the electric power transmitted from the power supply apparatus 100 to the electronic device 200 is not greater than the predetermined value C (No in step S806), the process of the present flowchart proceeds from step S806 to step S808.

In step S807, the CPU 205 determines whether the time measured by the timer 211 in step S805 has reached a predetermined time T5.

If the CPU 205 determines that the time measured by the timer 211 has reached the predetermined time T5 (Yes in step S807), the process of the present flowchart returns from step S807 to step S804. Further, in this case (Yes in step S807), the CPU 205 controls the timer 211 in such a way as to stop measuring the time.

If the CPU 205 determines that the time measured by the timer 211 has not reached the predetermined time T5 (No in step S807), the process of the present flowchart returns from step S807 to step S807. In the present exemplary embodiment, the predetermined time T5 is an arbitrary value that can be changed by a user or can be stored beforehand in the ROM 206.

In step S808, the CPU 205 sets the first communication mode (as operation mode to be adapted) for the electronic device 200. In this case, the CPU 205 terminates the process of the flowchart illustrated in FIG. 8. When the process in step S808 has been completed, the CPU 205 restarts the command reception process illustrated in FIG. 5. Thus, if the electronic device 200 receives the sixth command from the power supply apparatus 100 via the power receiving antenna 201, the electronic device 200 can transmit the charging information, as a response replying to the sixth command, to the power supply apparatus 100 via the power receiving antenna 201.

In the present exemplary embodiment, the process in step S805 is not limited to the above-described example in which the CPU 205 causes the modulation and demodulation circuit 204 to transmit the charging information detected in step S804 to the power supply apparatus 100.

For example, in step S805, the CPU 205 can control the modulation and demodulation circuit 204 in such a way as to transmit operational information of the electronic device 200, together with the charging information, to the power supply apparatus 100. In this case, the CPU 205 transmits the operational information of the electronic device 200 to the power supply apparatus 100 in the same manner as the transmission of the charging information.

Further, for example, in step S805, the CPU 205 can control the modulation and demodulation circuit 204 in such a way as to transmit the operational information of the electronic device 200 to the power supply apparatus 100, instead of transmitting the charging information. In this case, the CPU 205 transmits the operational information of the electronic device 200 to the power supply apparatus 100 in the same manner as the transmission of the charging information Further, if an error relating to the charging is detected in the communication process illustrated in FIG. 8, the CPU 205 can control the modulation and demodulation circuit 204 in such a way as to transmit error information indicating the occurrence of a charging error to the power supply apparatus 100. In this case, the CPU 205 can transmit the error information to the power supply apparatus 100, similar to the transmission of the charging information and the operational information of the electronic device 200 to the power supply apparatus 100.

As described above, if the modulation and demodulation circuit 204 can perform communications by using load modulation, the electronic device 200 according to the second exemplary embodiment causes the modulation and demodulation circuit 204 to send notification information relating to the charging of the electronic device 200 to the power supply apparatus 100.

Thus, even in a state where the second electric power is supplied to the electronic device 200, the power supply apparatus 100 can control the electric power supplied to the electronic device 200 according to information transmitted from the modulation and demodulation circuit 204 of the electronic device 200 to the power supply apparatus 100.

In this case, the electronic device 200 transmits information relating to the charging to the power supply apparatus 100 even in a case where the electronic device 200 does not include the communication unit 212 or when the communication unit 212 is not operating. Therefore, the electronic device 200 can prioritize using the electric power received from the power supply apparatus 100 for the charging of the battery 210 over supplying the electric power received from the power supply apparatus 100 to the communication unit 212.

The electronic device 200 according to the second exemplary embodiment is not only capable of reducing the load of the electronic device 200 but also capable of reducing electric power consumption by the electronic device 200 by omitting the electric power supplied to the communication unit 212 to transmit the charging information to the power supply apparatus 100.

Further, the power supply apparatus 100 can control the electric power to be supplied to the electronic device 200 according to the information transmitted to the power supply apparatus 100 from the modulation and demodulation circuit 204 of the electronic device 200 even in a case where the electronic device 200 does not include the communication unit 112 or when the communication unit 112 is not operating.

Accordingly, even in a state where the electric power required to charge the battery 210 is supplied to the electronic device 200 via the power supply antenna 201, the power supply apparatus 100 can appropriately control the power to be supplied to the electronic device 200 according to the information received via the modulation and demodulation circuit 104 from the electronic device 200.

The process described in the second exemplary embodiment brings effects similar to those brought by the processing described in the first exemplary embodiment if their contents are similar to each other.

In the second exemplary embodiment, the electronic device 200 performs the communication process illustrated in FIG. 8 to charge the battery 210. However, the electronic device 200 can perform the communication process illustrated in FIG. 8 even in a case where no charging of the battery 210 is performed. In this case, the electronic device 200 transmits the operational information to the power supply apparatus 100 instead of transmitting the charging information.

Other Embodiments

The power supply apparatus 100 according to the present invention is not limited to the example described in the first or second exemplary embodiment. Further, the electronic device 200 according to the present invention is not limited to the example described in the first or second exemplary embodiment. For example, the power supply apparatus 100 and the electronic device 200 according to the present invention can be realized by an integrated system that includes a plurality of apparatuses.

Further, various processing and functions described in the first and second exemplary embodiments can be realized by a computer program. In this case, the computer program according to the present invention can be executed by a computer (including a CPU) to realize various processes and functions described in respective embodiments.

Further, an Operating System (OS) running on the computer is available to realize various processes and functions described in respective embodiment.

To realize the present invention, a computer can execute a computer program when the program is loaded from a computer-readable storage medium. The computer readable storage medium is, for example, a hard disk, an optical disk, a compact disk read only memory (CD-ROM), a compact disk recordable (CD-R), a memory card, or a ROM. Further, the computer program according to the present invention can be provided from an external apparatus to a computer via a communication interface and can be executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-117135 filed May 25, 2011, which is hereby incorporated by reference herein in its entirety.

What is claimed is:

1. An electronic device comprising:
   a power receiving unit that receives power wirelessly from a power transmission apparatus which is different from the electronic device;
   a first communication unit that transmits first information to the power transmission apparatus in response to a command received from the power transmission apparatus according to a first communication method, wherein the first information includes information relating to a wireless power transfer;
   a second communication unit that transmits second information to the power transmission apparatus according to a second communication method, wherein the second information includes information relating to a wireless power transfer, and wherein the second communication method is different from the first communication method, and wherein the first communication unit is different from the second communication unit; and
   a control unit that performs, according to whether power received by the power receiving unit is equal to or more than a predetermined value, one of a first process and a second process,
   wherein the first process includes a process for causing the first communication unit to transmit the first information to the power transmission apparatus,
   wherein the second process includes a process for causing the second communication unit to transmit the second information to the power transmission apparatus,
   wherein the control unit performs the second process if power received by the power receiving unit is equal to or more than the predetermined value, and performs the first process if power received by the power receiving unit is not equal to or more than the predetermined value, and wherein a power value required to operate the first communication unit is smaller than a power value required to operate the second communication unit.

2. The electronic device according to claim 1, wherein the first information includes information relating to charging of a battery connected to the electronic device, and wherein the second information includes information relating to charging of the battery.

3. The electronic device according to claim 1, wherein the first information includes information relating to an operation of the electronic device, and wherein the second information includes information relating to an operation of the electronic device.

4. The electronic device according to claim 1, wherein the predetermined value is comparable to the power value required for operation of the second communication unit.

5. A control method for controlling a communication apparatus including a first communication unit and a second communication unit which is different from the first communication unit, the control method comprising:

receiving power wirelessly from a power transmission apparatus which is different from the electronic device;

performing, according to whether power received from the power transmission apparatus is equal to or more than a predetermined value, one of a first process and a second process;

performing the second process if power received from the power transmission apparatus is equal to or more than the predetermined value; and performing the first process if power received from the power transmission apparatus is not equal to or more than the predetermined value, wherein the first process includes a process for transmitting first information via the first communication unit to the power transmission apparatus according to a first communication method, wherein the second process includes a process for transmitting second information via the second communication unit to the power transmission apparatus according to a second communication method, wherein the second information includes information relating to a wireless power transfer, wherein the second communication method is different from the first communication method, and wherein a power value required to operate the first communication unit is smaller than a power value required to operate the second communication unit.

6. The method according to claim 5, wherein the first information includes information relating to an operation of an electronic device, and wherein the second information includes information relating to an operation of the electronic device.

7. The method according to claim 5, wherein the predetermined value is comparable to a power value used for communicating according to the second communication method.

8. The electronic device according to claim 1, wherein the first information is used for causing the power transmission apparatus to control a wireless power transfer, and wherein the second information is used for causing the power transmission apparatus to control a wireless power transfer.

9. The method according to claim 5, wherein the first information includes information relating to charging of a battery connected to the electronic device, and wherein the second information includes information relating to charging of the battery.

10. A non-transitory computer-readable storage medium storing a program wherein the program causes a computer to perform a control method for controlling a communication apparatus including a first communication unit and a second communication unit which is different from the first communication unit, the method comprising:

receiving power wirelessly from a power transmission apparatus;

performing, according to whether power received from the power transmission apparatus is equal to or more than a predetermined value, one of a first process and a second process;

performing the second process if power received from the power transmission apparatus is equal to or more than the predetermined value; and performing the first process if power received from the power transmission apparatus is not equal to or more than the predetermined value, wherein the first process includes a process for transmitting first information via the first communication unit to the power transmission apparatus according to a first communication method, wherein the first information includes information relating to a wireless power transfer, wherein the second process includes a process for transmitting second information via the second communication unit to the power transmission apparatus according to a second communication method, wherein the second information includes information relating to a wireless power transfer, wherein the second communication method is different from the first communication method, and wherein a power value required to operate the first communication unit is smaller than a power value required to operate the second communication unit.

11. The electronic device according to claim 1, wherein the second communication method is one of a wireless LAN and Bluetooth.

12. The electronic device according to claim 1, wherein the first communication unit transmits third information to the power transmission apparatus according to the first communication method, and wherein the third information is used for communicating according to the second communication method.

13. The electronic device according to claim 1, wherein the third information includes at least one of Service Set Identifier (SSID) and Media Access Control (MAC) address.

14. The electronic device according to claim 1, further comprising a storing unit that stores at least one of image data and audio data in a storage medium, wherein the control unit causes the second communication unit to transmit data stored in the storage medium and the second information to the power transmission apparatus.

15. The electronic device according to claim 14, wherein the data stored in the storage medium includes data which is not transmitted to the power transmission apparatus.

16. The electronic device according to claim 1, wherein the control unit changes a communication unit used for communicating with the power transmission apparatus from the second communication unit to the first communication unit if power, which is received by the power receiving unit, is lowered than the predetermined value after the second information is transmitted to the power transmission apparatus by the second communication unit.

17. The method according to claim 5, further comprising changing a communication method for communicating with the power transmission apparatus from the second communication method to the first communication method if power, which is received from the power transmission apparatus, is lowered than the predetermined value after the second information is transmitted to the power transmission apparatus according to the second communication method.

* * * * *